US010281981B2

(12) United States Patent
Kim et al.

(10) Patent No.: US 10,281,981 B2
(45) Date of Patent: May 7, 2019

(54) AR OUTPUT METHOD AND ELECTRONIC DEVICE FOR SUPPORTING THE SAME

(71) Applicant: Samsung Electronics Co., Ltd, Gyeonggi-do (KR)

(72) Inventors: Kyung Tae Kim, Gyeonggi-do (KR); Su Young Park, Gyeonggi-do (KR); Sang Chul Baek, Seoul (KR); Jae Yung Yeo, Gyeonggi-do (KR); Young Keun Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 157 days.

(21) Appl. No.: 15/415,817

(22) Filed: Jan. 25, 2017

(65) Prior Publication Data

US 2017/0212585 A1 Jul. 27, 2017

(30) Foreign Application Priority Data

Jan. 25, 2016 (KR) ........................ 10-2016-0008812

(51) Int. Cl.
*G06F 3/01* (2006.01)
*G06T 19/00* (2011.01)
*G06F 1/16* (2006.01)
*G06F 3/00* (2006.01)

(52) U.S. Cl.
CPC .............. *G06F 3/013* (2013.01); *G06F 3/017* (2013.01); *G06T 19/006* (2013.01)

(58) Field of Classification Search
CPC ...... G06F 3/011; G06F 3/017; G06F 3/04815; G06F 2203/04808; G06F 3/013; G06F 3/04842; G06F 3/04845; G06T 19/006; G06T 19/20

USPC ......................................................... 345/633
See application file for complete search history.

(56) References Cited

U.S. PATENT DOCUMENTS

| 9,858,720 B2* | 1/2018 | da Veiga ............ G02B 27/0172 |
| 2005/0231530 A1 | 10/2005 | Liang et al. |
| 2013/0044128 A1* | 2/2013 | Liu .......................... G09G 5/00 345/633 |
| 2014/0002444 A1* | 1/2014 | Bennett ................... G06F 3/012 345/419 |
| 2015/0187108 A1* | 7/2015 | Mullins ................. G06T 19/006 345/633 |
| 2016/0378294 A1* | 12/2016 | Wright ................ G06F 3/04815 715/851 |
| 2017/0091577 A1* | 3/2017 | Lee ........................ G01B 11/22 |

(Continued)

*Primary Examiner* — Kimberly A Williams

(57) ABSTRACT

An augmented reality (AR) output method includes generating line of sight information of a user of the electronic device based on at least one of a sensor module or a camera module of the electronic device, extracting line of sight space information corresponding to the line of sight information of the user from three-dimensional (3D) space information corresponding to a real object around the user based on the line of sight information, recognizing a user input using the camera module or the sensor module, comparing a first portion of the line of sight space information with the user input, generating a compensated input information by compensating the user input based on comparing the first portion with the user input, generating a first virtual object based on the compensated input information, and outputting the first virtual object on a display of the electronic device.

18 Claims, 22 Drawing Sheets

(56) References Cited

U.S. PATENT DOCUMENTS

2017/0330385 A1* 11/2017 Kinstner ................ G06T 19/20
2017/0372499 A1* 12/2017 Lalonde ............... G02B 27/017
2018/0190022 A1*  7/2018 Zamir .................. G06F 3/0346

* cited by examiner

AR OUTPUT METHOD AND ELECTRONIC DEVICE FOR SUPPORTING THE SAME

CROSS-REFERENCE TO RELATED APPLICATION AND CLAIM OF PRIORITY

The present application is related to and claims the benefit under 35 U.S.C. § 119(a) of a Korean patent application filed on Jan. 25, 2016 in the Korean Intellectual Property Office and assigned Serial number 10-2016-0008812, the entire disclosure of which is hereby incorporated by reference.

TECHNICAL FIELD

The present disclosure relates to an augmented reality (AR) output method for combining and outputting a real object and a virtual object on a three-dimensional (3D) space and an electronic device for supporting the same.

BACKGROUND

As smartphones are increased in resolution and calculation speed and as graphic processing devices thereof are enhanced in performance, virtual reality (VR) which operated in only conventional large devices operates in small, lightweight devices such as smart glasses, head mount devices (HMDs), and the like. For example, users view three-dimensional (3D) images watched on conventional 3D televisions (TVs) and watch 360-degree panorama images with low utilization, through their HMDs. Further, an HMD may sense motion of a head of its user via its acceleration sensor and may provide magnificence he or she does not feel on a conventional monitor or a screen of a smartphone to him or her.

If outputting augmented reality (AR), an electronic device according to the related art operates in such a manner as to generate a simple line or graphic symbol based on an input of its user or simply modify a virtual object. In this case, the electronic device may be shaken in a process where an input of the user occurs and may fail to generate a desired input corresponding to intention of the user.

SUMMARY

To address the above-discussed deficiencies, it is a primary object to provide to provide an augmented reality (AR) output method for matching a user input to a boundary of an ambient object or a surface of the object and drawing a line to correspond to intention of a user although he or she roughly draws the line and an electronic device for supporting the same.

In accordance with an aspect of the present disclosure, an AR output method is provided. The method may include generating line of sight information of a user of the electronic device based on at least one of a sensor module or a camera module of the electronic device, extracting line of sight space information corresponding to the line of sight information of the user from three-dimensional (3D) space information corresponding to a real object around the user based on the line of sight information, recognizing a user input using the camera module or the sensor module, comparing a first portion of the line of sight space information with the user input, generating compensated input information by compensating the user input based on comparing the first portion with the user input, generating a first virtual object based on the compensated input information, and outputting the first virtual object on a display of the electronic device.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
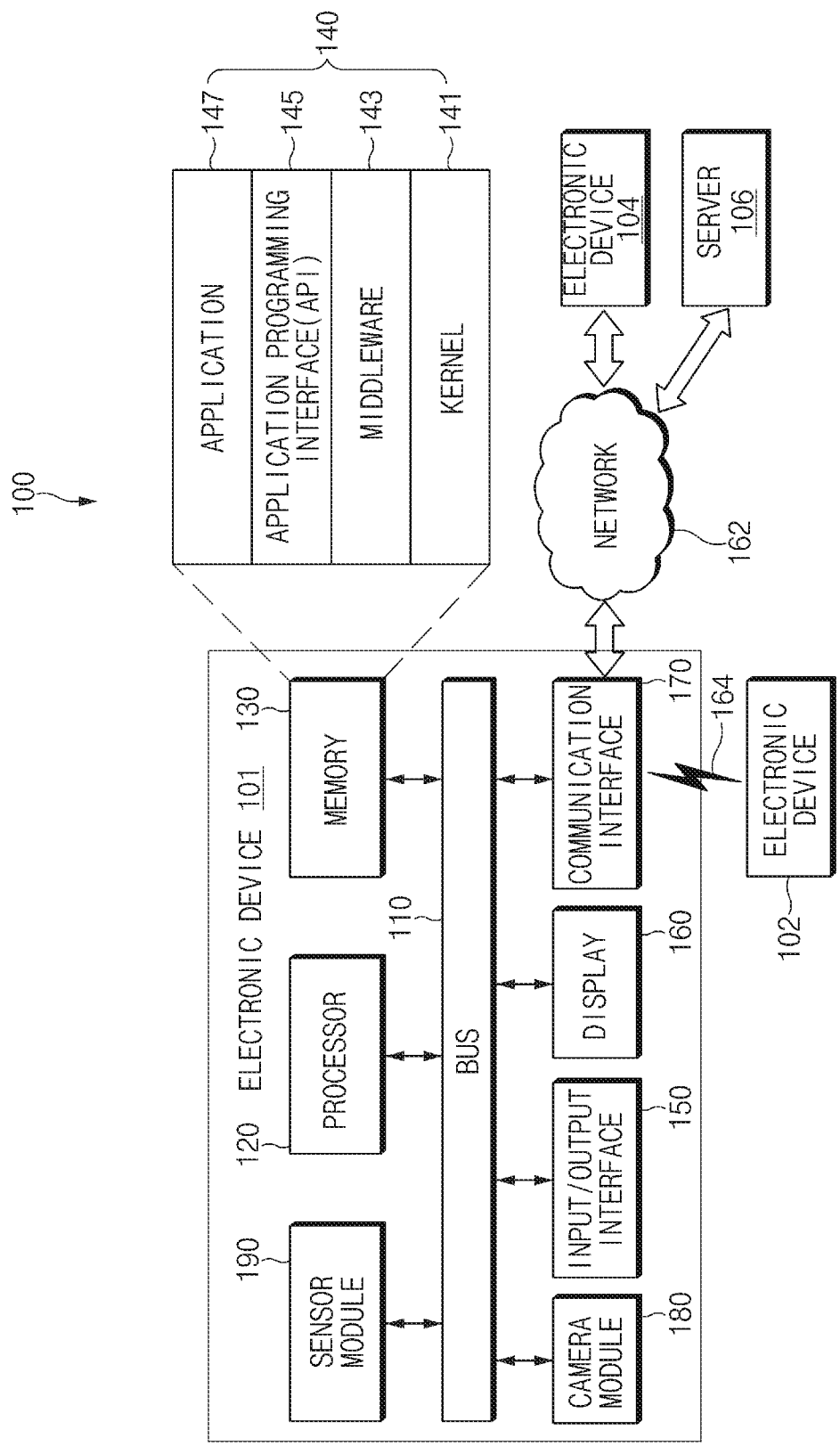
FIG. 1 is a block diagram illustrating a configuration of an electronic device in a network environment according to various embodiments.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, the present disclosure is described with reference to the accompanying drawings. Various modifications are possible in various embodiments of the present disclosure and embodiments are illustrated in drawings and related detailed descriptions are listed. However, the present disclosure is not intended to be limited to the specific embodiments, and it is understood that it should include all modifications and/or, equivalents and substitutes within the scope and technical range of the present disclosure. With respect to the descriptions of the drawings, like reference numerals refer to like elements.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

Depending on the situation, the expression "configured to" used herein may be used as, for example, the expression "suitable for", "having the capacity to", "designed to", "adapted to", "made to", or "capable of". The term "configured to" must not mean only "specifically designed to" hardwarely. Instead, the expression "a device configured to" may mean that the device is "capable of" operating together with another device or other components. For example, a "processor configured to perform A, B, and C" may mean a generic-purpose processor (e.g., a central processing unit (CPU) or an application processor) which may perform corresponding operations by executing one or more software programs which stores a dedicated processor (e.g., an embedded processor) for performing a corresponding operation.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

Electronic devices according to various embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

In various embodiments, the electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

In various embodiments, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. The electronic devices according to various embodiments of the present disclosure may be flexible electronic devices. Also, electronic devices according to various embodiments of the present disclosure are not limited to the above-mentioned devices, and may include new electronic devices according to technology development Hereinafter, electronic devices according to various embodiments will be described with reference to the accompanying drawings. The term "user" used herein may refer to a person who uses an electronic device or may refer to a device (e.g., an artificial electronic device) that uses an electronic device.

FIG. 1 is a block diagram illustrating a configuration of an electronic device 101 in a network environment 100 according to various embodiments. In various embodiments, the electronic device 101 may be a wearable device which is wearable on a head of its user. For example, the electronic device 101 may be smart glasses, a head mounted device (HMD).

Referring to FIG. 1, the electronic device 101 in various embodiments can be connected with an external device (e.g., a first external device 102, a second external device 104, or a server 106) over a network 162 or local-area communication 164. The electronic device 101 can include a bus 110, a processor 120, a memory 130, an input/output (I/O) interface 150, a display 160, a communication interface 170, a camera module 180, and a sensor module 190. In various embodiments, at least one of the components can be omitted from the electronic device 101, and another component can be additionally included in the electronic device 101.

The bus 110 can be, for example, a circuit which connects the components 120 to 190 with each other and transmits communication (e.g., a control message and/or data) between the components 120 to 190.

The processor 120 can include one or more of a central processing unit (CPU), an application processor (AP), or a communication processor (CP). For example, the processor 120 can perform calculation or data processing about control and/or communication of at least another of the components of the electronic device 101.

In various embodiments, the processor 120 can generate a three-dimensional (3D) space and can output augmented reality (AR) in which a real object and a virtual object are combined, on the 3D space. The AR can be technologies of overlapping and showing a virtual object with a real world (or a real object) seen by eyes of the user.

According to various embodiments, the processor 120 can use a method of recognizing an object in a marker/markerless manner from actual reality which is captured by the camera module 180 and is then stored in the memory 130 and displaying virtual reality (VR) data on the recognized object or a method of recognizing an object in the marker/markerless manner from actual reality captured in real time by the camera module 180 and selecting and displaying VR data on the recognized object as a method of selecting and displaying an object of actual reality to generate VR data in the actual reality.

According to various embodiments, the processor 120 can recognize line of sight information of the user (or a head pose of the user and camera location information), can recognize input intention information including a gesture of the user, and can recognize an object region and attributes of an object by reading data about n ($1 \leq n \leq N$) real objects among data about N (N>1) real objects using a method of recognizing the N real objects. The processor 120 can assign M (M>1) virtual points for the recognized object region, can configure virtual point combination information including information about the M virtual points and information about an order of virtual point combinations, and read (n+1)th to Nth actual reality data. The processor 120 can determine an object region, which includes i ($1 \leq i \leq M$) or more virtual points corresponding to the virtual point combination information and is matched to combinations of the i virtual points, line of sight information of the user, the input intension information including the gesture, and the order of virtual point combinations j ($1 \leq j \leq M$) times or more, as the same object region as an object region recognized from the nth actual reality data.

Additional information about a process of generating the 3D space and converting the user input using the processor 120 can be provided with reference to FIGS. 2 to 20.

The memory 130 can include a volatile and/or non-volatile memory. The memory 130 can store, for example, a command or data associated with at least another of the components of the electronic device 101.

According to various embodiments, the memory 130 can store data necessary for outputting AR. The data can include data about a real object or data about a virtual object. For example, the data about the real object can include location information of each of real objects included in an image collected by the camera module 180 and distance information and relative distance information from the camera module 180, and the like. The data about the virtual object can include a size and a location of each of virtual objects output together with real objects generated by an input of the user, information about correlation with the real objects, and the like.

According to an embodiment, the memory 130 can software and/or a program 140. The program 140 can include, for example, a kernel 141, a middleware 143, an application programming interface (API) 145, and/or at least one application program 147 (or "at least one application"). At least part of the kernel 141, the middleware 143, or the API 145 can be referred to as an operating system (OS).

The kernel 141 can control or manage, for example, system resources (e.g., the bus 110, the processor 120, or the memory 130, and the like) used to execute an operation or function implemented in the other programs (e.g., the middleware 143, the API 145, or the application program 147). Also, as the middleware 143, the API 145, or the application program 147 accesses a separate component of the electronic device 101, the kernel 141 can provide an interface which can control or manage system resources.

The middleware 143 can play a role as, for example, a go-between such that the API 145 or the application program 147 communicates with the kernel 141 to communicate data.

Also, the middleware 143 can process one or more work requests, received from the at least one application program 147, in order of priority. For example, the middleware 143 can assign priority which can use system resources (the bus 110, the processor 120, or the memory 130, and the like) of the electronic device 101 to at least one of the at least one application program 147. For example, the middleware 143 can perform scheduling or load balancing for the one or more work requests by processing the one or more work requests in order of priority assigned to the at least one of the at least one application program 147.

The API 145 can be, for example, an interface in which the application program 147 controls a function provided from the kernel 141 or the middleware 143. For example, the API 145 can include at least one interface or function (e.g., a command) for file control, window control, image processing, or text control, and the like.

The I/O interface 150 can play a role as, for example, an interface which can send a command or data, input from a user or another external device, to another component (or other components) of the electronic device 101. Also, the I/O interface 150 can output a command or data, received from another component (or other components) of the electronic device 101, to the user or the other external device.

The display 160 can include, for example, a liquid crystal display (LCD), a light emitting diode (LED) display, an organic LED (OLED) display, a microelectromechanical systems (MEMS) display, or an electronic paper display. The display 160 can display, for example, a variety of content (e.g., text, an image, a video, an icon, or a symbol, and the like) to the user. The display 160 can include a touch screen, and can receive, for example, a touch, a gesture, proximity, or a hovering input using an electronic pen or part of a body of the user.

In various embodiments, the display 160 can output AR based on control of the processor 120. For example, if the display 160 is a transparent display (or a display of a see-through type), it can project real objects and can output a virtual object associated with the real objects. For another example, if the display 160 is be of a type (e.g., an opaque type) of outputting an image in which surroundings of the electronic device 101 are captured by the camera module 180, it can output an AR screen in which a virtual object is added to the image in which the surroundings of the electronic device 101 are captured. The display 160 can include an output device which displays VR data on an object on actual reality data and can include one of a normal output device such as a liquid crystal display (LCD) and a transparent output device such as an HMD, glasses, goggles, a window.

In various embodiments, the display 160 can display a 3D VR space, an operation object on the 3D VR space, movement of a 3D virtual object, and contents input by the user to him or her. As the user operates the virtual object using the operation object, the display 160 can visually display motion of the virtual object to him or her.

The communication interface 170 can establish communication between, for example, the electronic device 101 and an external device (e.g., a first external electronic device 102, a second external electronic device 104, or a server 106). For example, the communication interface 170 can connect to the network 162 through wireless communication or wired communication and can communicate with the external device (e.g., the second external electronic device 104 or the server 106).

The wireless communication can use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication can include, for example, the local-area communication 164. The local-area communication 164 can include, for example, at least one of wireless-fidelity (Wi-Fi) communication, Bluetooth (BT) communication, near field communication (NFC) communication, or global navigation satellite system (GNSS) communication, and the like.

An MST module can generate a pulse based on transmission data using an electromagnetic signal and can generate a magnetic field signal based on the pulse. The electronic device 101 can send the magnetic field signal to a point of sales (POS) terminal. The POS terminal can restore the data by detecting the magnetic field signal using an MST reader and converting the detected magnetic field signal into an electric signal.

The GNSS can include, for example, at least one of a global positioning system (GPS), a global navigation satellite system (Glonass), a Beidou navigation satellite system (hereinafter referred to as a "Beidou®"), or a Galileo® (i.e., the European global satellite-based navigation system) according to an available area or a bandwidth, and the like. Hereinafter, the "GPS" used herein can be interchangeably with the "GNSS". The wired communication can include at least one of, for example, universal serial bus (USB) communication, high definition multimedia interface (HDMI) communication, recommended standard 232 (RS-232) communication, or plain old telephone service (POTS) communication, and the like. The network 162 can include a telecommunications network, for example, at least one of a computer network (e.g., a local area network (LAN) or a wide area network (WAN)), the Internet, or a telephone network.

According to various embodiments, the communication interface 170 can include a communication module which connects to one of a wired communication network and a wireless communication network based on communication standards and a protocol and can perform a function of connecting a communication network with a server (or device) over a communication channel or connecting a communication channel with another AR device. The communication interface 170 can receive actual reality data stored in a server (or a device) on the communication network and can perform a function of obtaining the actual reality data and VR data. The communication interface 170 can transmit user input requirements processed by the processor 120 to another device to share the user input requirements with the other device.

Each of the first and second external electronic devices 102 and 104 can be the same as or different device from the electronic device 101. According to an embodiment, the server 106 can include a group of one or more servers. According to various embodiments, all or some of operations executed in the electronic device 101 can be executed in another electronic device or a plurality of electronic devices (e.g., the first external electronic device 102, the second external electronic device 104, or the server 106). According to an embodiment, if the electronic device 101 should perform any function or service automatically or according to a request, it can request another device (e.g., the first external electronic device 102, the second external electronic device 104, or the server 106) to perform at least part of the function or service, rather than executing the function or service for itself or in addition to the function or service. The other electronic device (e.g., the first external electronic device 102, the second external electronic device 104, or the server 106) can execute the requested function or the added function and can transmit the executed result to the electronic device 101. The electronic device 101 can process the received result without change or additionally and can provide the requested function or service. For this purpose, for example, cloud computing technologies, distributed computing technologies, or client-server computing technologies can be used.

In various embodiments, each of the first and second external electronic devices 102 and 104 can be used as a device which provides an input to AR. For example, if the user generates an input through a 2D display of the first and second external electronic devices 102 and 104, information about the input can be transmitted to the electronic device 101. The electronic device 101 can convert the input into an input on a 3D space and can generate a virtual object corresponding to the converted input. Additional information about the input using the first and second external electronic devices 102 and 104 can be provided with reference to FIGS. 15 to 18.

The camera module 180 can collect image data in real time from an AR output. The camera module 180 can include at least one red, green, and blue (RGB) cameras, an infrared (IR) camera, a depth camera, or a thermal camera. In various embodiments, the image data can be generated by combining data collected by a plurality of cameras.

For example, the camera module 180 can include an IR output device and an IR camera. The IR output device can emit infrared rays to an object around the electronic device 101, and the IR camera can sense infrared rays reflected from the object.

The sensor module 190 can include a device which obtains an analog or digital signal type of a sensor signal from one sensor. The sensor module 190 can include an electric signal sensor which generates an electric signal (e.g., resistance, current, and voltage) based on an environment change and a camera sensor which selectively obtain only specific data necessary for a sensor input among actual reality data after obtaining the actual reality data together with the camera module 180. In various embodiments, if including the camera sensor, the sensor module 190 can be integrated with the camera module 180.

Figure 2:
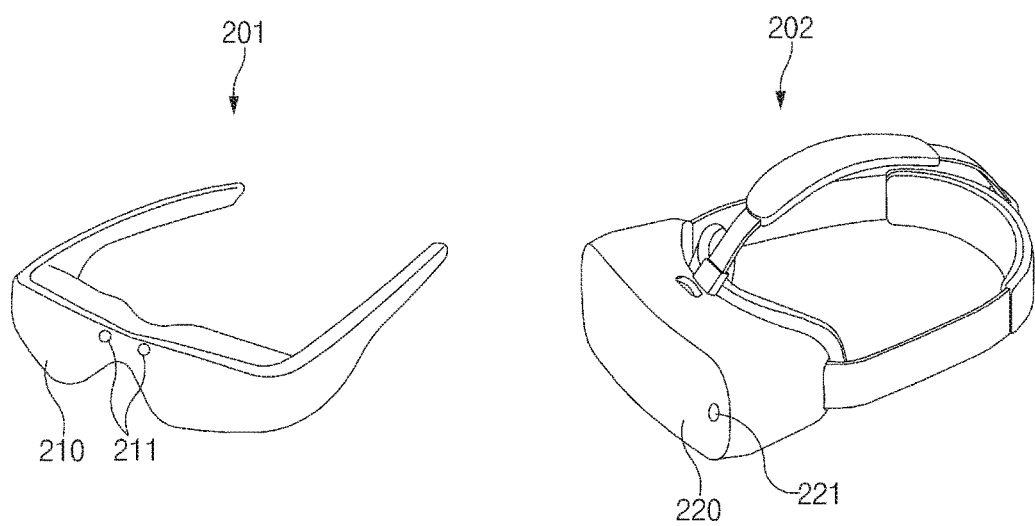
FIG. 2 illustrates a wearable device according to various embodiments.

FIG. 2 is a drawing illustrating a wearable device according to various embodiments. In various embodiments, an electronic device 201 or 202 of FIG. 2 can be an electronic device 101 of FIG. 1.

In FIG. 2, an embodiment is exemplified as the electronic device 201 or 202 is smart glasses or an HMD. However, embodiments are not limited thereto. For example, the electronic device 201 or 202 can be a device such as a smartphone or a tablet. A user can hold the device such as the smartphone or the tablet and can capture surroundings using a depth camera. The user can add a virtual object to an image using a user input while checking a screen.

Referring to FIG. 2, the electronic device 201 can be a smart glasses type of device which provides AR. The electronic device 201 can include a display 210 on its front surface. In an embodiment, the display 210 can be implemented with a transparent display (or a see-through type of a display). The display 210 can reflect a real object around the electronic device 201 and can output a virtual object associated with the real object. The user can wear the electronic device 201 in the form of glasses and can check AR on the display 210. In various embodiments, the display 210 can operate in such a manner (e.g., an opaque manner) as to capture a real object using a camera module 211 and output the captured image to eyes of the user. The display 210 can output an AR screen in which a virtual object is added to an image where surroundings of the electronic device 101 are captured.

The electronic device 201 can include the camera module 211. The camera module 211 can be a camera module 180 of FIG. 1. The camera module 211 can collect an image in which a real object around the electronic device 201 is captured. In various embodiments, the camera module 211 can be arranged at a front surface of the electronic device 201 in a direction where the user sees the outside. Line of sight information of the user (e.g., a direction in which a line of sight of the user is oriented) can be identical to a direction of the camera module 211. The line of sight information of the user can be determined using location information of the camera module 211.

In an embodiment, the camera module 211 can be a stereo camera. The stereo camera can capture one object to simultaneously obtain two images by mounting two capturing lenses. In another embodiment, the camera module 211 can include an IR output device and an IR camera. The IR output device can emit infrared rays to an object around the electronic device 201, and the IR camera can sense infrared rays reflected from the object.

In various embodiments, an image collected by the camera module 211 can be used to generate a depth map and recognize a gesture of the user. Also, the camera module 211 can be used for 3D modeling/mapping of an object around the electronic device 201.

The electronic device 202 can be an HMD which is worn on a head of the user and checks a display arranged before his or her eyes. In various embodiments, the electronic device 202 can be of a shape in which a display device (e.g., a smartphone) and a fixing part for fixing the display device are combined. The user can use the electronic device 202 in such a manner as to mount the smartphone on the fixing part and putting the fixing part on his or her head.

According to various embodiments, the electronic device 202 can include a camera module 221. The camera module 221 can be the camera module 180 of FIG. 1. The camera module 221 can collect an image in which a real object around the electronic device 202 is captured. The camera module 211 can be arranged at a front surface of the electronic device 202 in a direction where the user sees the outside. For example, the camera module 211 can be a rear camera of a smartphone.

According to various embodiments, the camera module 211 or 221 can include at least one or more RGB cameras, an IR camera, a depth camera, or a thermal camera. A processor in the electronic device 201 or 202 can obtain depth map information and an RGB image for an object around the electronic device 201 or 202 using the camera module 211 or 221. The processor can extract one or more objects from the obtained information based on an input of the user or a request from an external device or automatically to generate object information. For example, the object information can include at least part of depth map information of part of the at least appearance of an object, an external characteristic (e.g., a color, a size, and the like) of the object, absolute and relative locations of the object, and a boundary (e.g., a contour line and a surface) of the object.

Figure 3A:
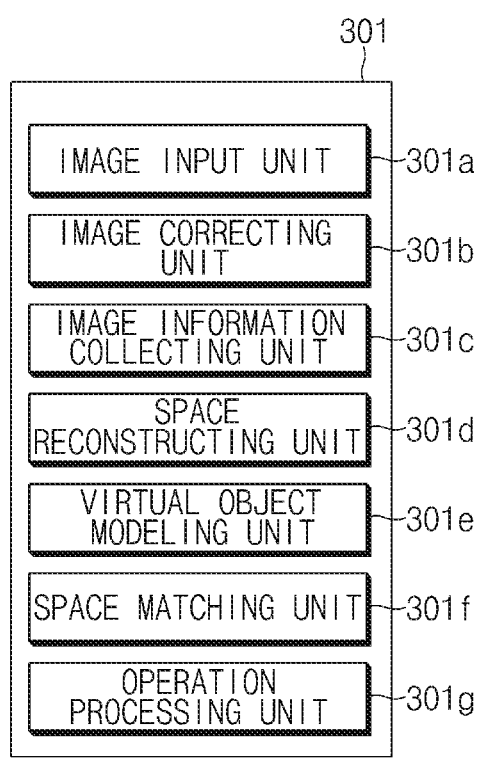
FIG. 3A is a block diagram illustrating a detailed configuration of a processor according to various embodiments.

FIG. 3A is a block diagram illustrating a detailed configuration of a processor according to various embodiments. In FIG. 3A, an embodiment is exemplified as components are classified according to a function. However, embodiments are not limited thereto. For example, the components can be integrated with each other or are separated from each other. In various embodiments, each of the components can be a function or a program module stored in a memory. A processor 301 can be a processor 120 of FIG. 1.

The processor 301 can include an image input unit 301a, an image correcting unit 301b, an image information collecting unit 301c, a space reconstructing unit 301d, a virtual object modeling unit 301e, a space matching unit 301f, and an operation processing unit 301g.

The image input unit 301a can receive image information with respect to an operation object (e.g., a finger end) used by a user to operate a virtual object and surroundings seen from a line of sight of the user, via a camera module. The camera module can include at least one of a color camera, a depth camera, a thermal camera, and an IR camera. The camera module can be of a form where a plurality of cameras are combined. The image input unit 301a can receive a color image or a depth image for the operation object and the surroundings.

The image correcting unit 301b can correct image information of the operation object and the surroundings, obtained by a camera, such that a line of sight of the camera module is identical to a line of sight of the user who uses the operation object. The image correcting unit 301b can obtain accurate relative location relationship information between eyes of the user and the operation object. The obtained relative location relationship information between the eyes of the user and the operation object can be used as information to ascertain a relative location relationship between a virtual object and the operation object in a 3D VR space to which a 3D rendering space including the virtual object is matched.

The image information collecting unit 301c can read input image data and can extract a hue/saturation, a depth, and a contour information value of a specific object from the read image data. The image information collecting unit 301c can read the extracted hue/saturation and can detect a boundary line of a region classified relative to the hue/saturation. The image information collecting unit 301c can connect and combine the detected boundary lines, can recognize one or more object regions, each of which has a geometric structure, and can recognize the object region as an object to output VR data.

The space reconstructing unit 301d can reconstruct a 3D VR space for the surroundings including the operation object using image information input through the image input unit 301a. The space reconstructing unit 301d can implement surroundings in a real world where the user moves the operation object to operate a virtual object on AR or VR as a virtual 3D space and can ascertain location information of the operation object on the implemented virtual 3D space. The operation object used by the user can be modeled as a 3D virtual operation object by the space reconstructing unit 301d, and location information on the 3D VR space can be represented as a 3D coordinate based on movement on the real world.

The virtual object modeling unit 301e can model a virtual model operated by the operation object used by the user to generate a 3D virtual rendering space including the modeled virtual object. Location information of the virtual object modeled by the virtual object modeling unit 301e can be represented as a 3D coordinate on the 3D rendering space. Also, the virtual object modeling unit 301e can add physical characteristic information in a weightless state of a virtual object to model the virtual object.

The space matching unit 301f can match the 3D rendering space generated by the virtual object modeling unit 301e to a 3D VR space for surroundings of the user, reconstructed by the space reconstructing unit 301d and can calculate relative location relationship information between an operation object and a 3D virtual object on the 3D VR space.

The operation processing unit 301g can determine whether the user operates a virtual object on a VR object and space calculated by the virtual object modeling unit 301e or the space reconstructing unit 301d. Also, if it is determined that a user input of the virtual object is requested, the operation processing unit 301g can execute a function of the virtual object corresponding to user input requirements. The operation processing unit 301g can correspond to an input operation of the user based on relative location and size relationship information between the operation object and the virtual object.

Figure 3B:
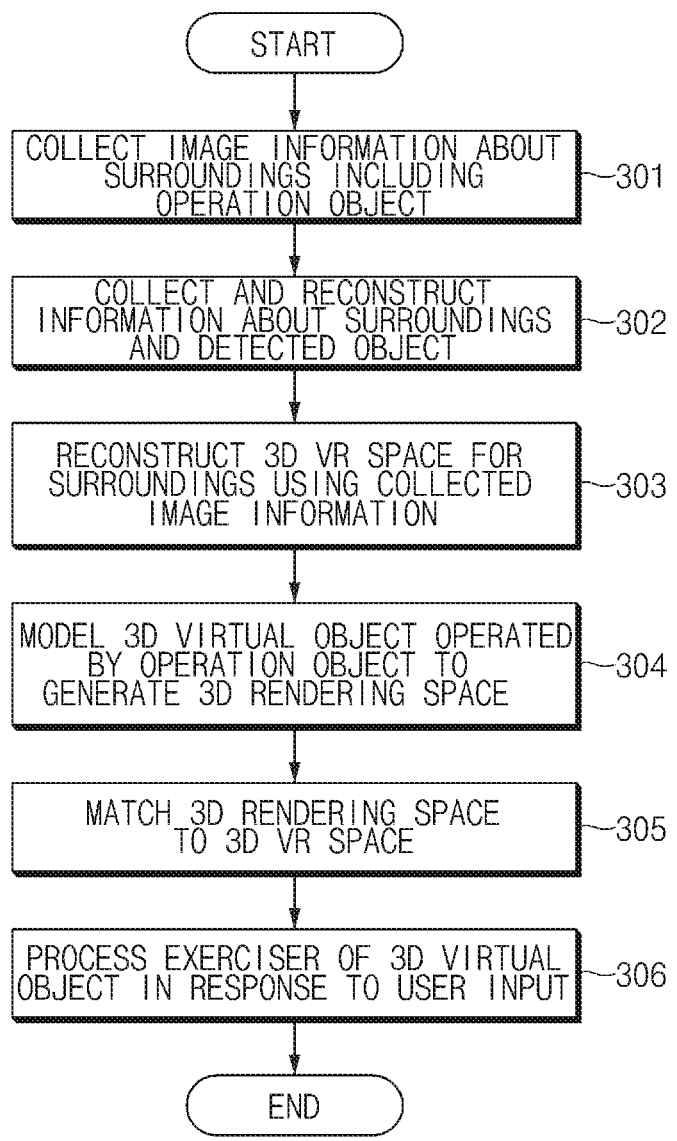
FIG. 3B is a flowchart illustrating an AR generation method according to various embodiments.

FIG. 3B is a flowchart illustrating an AR generation method according to various embodiments.

Referring to FIG. 3B, in operation 301, a processor 120 of FIG. 1 can collect image information generated by capturing surroundings including an operation object (e.g., part of a body of a user) using a camera module 180 of FIG. 1.

In operation 302, the processor 120 can collect and reconstruct information about surroundings of an electronic device 101 of FIG. 1 and a detected object using the collected image information.

In operation 303, the processor 120 can reconstruct a 3D VR space for the surroundings of the electronic device 101 using the collected image information.

In operation 304, the processor 120 can model a 3D virtual object operated by the operation object and can generate a 3D rendering space including the 3D virtual object.

In operation 305, the processor 120 can match the 3D rendering space to the 3D VR space.

In operation 306, the processor 120 can determine whether a user input on the 3D virtual object occurs and can process motion of the 3D virtual object in response to the user input.

Figure 3C:
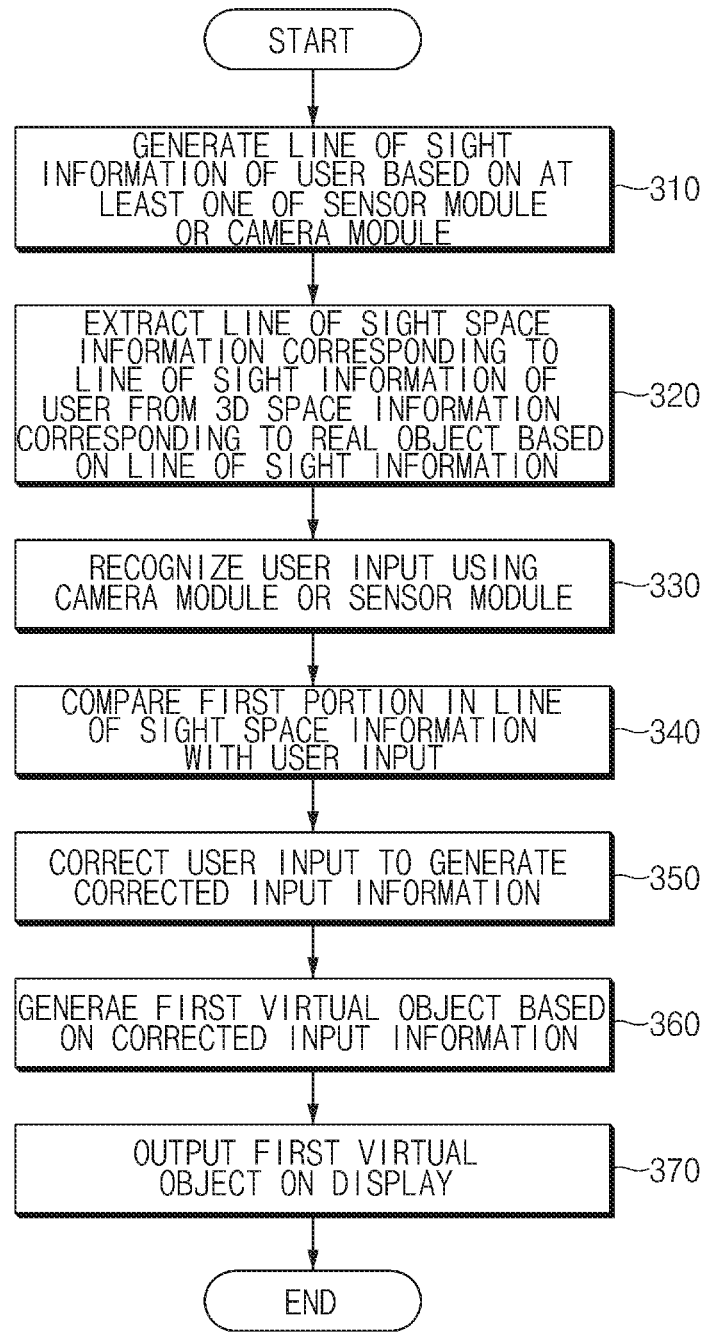
FIG. 3C is a flowchart illustrating an AR output method according to various embodiments.

FIG. 3C is a flowchart illustrating an AR output method according to various embodiments.

Referring to FIG. 3C, in operation 310, a processor 120 of FIG. 1 can generate line of sight information of a user of an electronic device 101 of FIG. 1 based on at least one of a sensor module 190 or a camera module 180 of FIG. 1. In an embodiment, the line of sight information can be identical to a direction of the camera module 180. The line of sight information of the user can be determined using information about a location or direction of the camera module 180. In another embodiment, the line of sight information can be determined through a direction of a head of a user or a direction of his or her pupils, recognized via the sensor module 190.

In operation 320, the processor 120 can extract line of sight information corresponding to the line of sight information of the user from 3D space information corresponding to a real object around the user based on the line of sight information.

In various embodiments, the processor 120 can generate the 3D space information corresponding to the real object around the user based on an image captured by the camera module 180 or information provided from an external device (e.g., a server 106 in FIG. 1). For example, the 3D space information can include information about a location, a size, and the like of an object recognized by recognizing an object from an image captured by the camera module 180.

In various embodiments, the processor 120 can extract line of sight space information corresponding to a line of sight of the user. The line of sight space information can be 3D space information of a region corresponding to line of sight space information of the user based on at least one of the sensor module 190 or the camera module 180 in the 3D space information.

In operation 330, the processor 120 can recognize a user input using the camera module 180 or the sensor module 190. The user input can be an input for generating a virtual object, on a 3D space according to the line of sight space information.

For example, the user input can be menu selection on a graphic user interface (GUI). For another example, the user input can be an input according to a specific gesture or a specific input pattern of the user.

In various embodiments, the user input can include at least one of a point input (e.g., selection of a specific point of an object with a finger) or a stroke input (e.g., movement of a finger from a first point to a second point).

In an embodiment, if the user wears an HMD type of an electronic device 101, the processor 120 can start to recognize a user input. In another embodiment, if the electronic device 101 is powered on or if a specific application is executed, the processor 120 can start to recognize a user input.

In various embodiments, waiting for inputting the user input can be waiting after one of a point input or a stroke input is selected. A method of selecting the one of the point input or the stroke input can include a GUI input, an input pattern of the user, and a previous gesture of the user. The point input or the stroke input can be selected based on a type of a first input during the waiting for inputting the user input.

The processor 120 can recognize a user input of the user using the camera module 180 or the sensor module 190. The user input can be represented as a 2D coordinate or a 3D coordinate. In various embodiments, the user input can include at least one of a point input, a stroke input, or a looped curve input. In various embodiments, the user input can be a 3D input (e.g., a stroke input on a virtual space) or a 2D input (e.g., a swipe input on a 2D display screen).

According to various embodiments, the processor 120 can derive attributes information of the user input. The attributes information can include a type of the user input (e.g., a point input, a stroke input, and a looped curve input) and user input location information (e.g., a start point, a movement direction, and an end point). For example, the attributes information can include a coordinate of the user input, a curvature radius, a feature of a curved point (e.g., a pole, an inflection point, and the like), a location of the pole, a radius of a circle, and a length of each of a major axis and a minor axis of an oval, and the like. In addition, the attributes information can include attributes which can represent a various patterns.

In various embodiments, an origin point for recognizing the user input can be a line of sight of the user and can be one point (e.g., the center of a 2D display) corresponding to an input plane (on the 2D display).

In various embodiments, attributes of the input plane of the user can be changed based on a line of sight of the user (e.g., a head pose of the user or a direction of a camera). The attributes of the input plane of the user can be changed based on a physical feature or situation of the user. The attributes of the user plane can include a 2D or 3D coordinate, a size, and the like.

In operation 340, the processor 120 can compare a first portion of the line of sight space information with the user input. The processor 120 can derive a coordinate of a corresponding point (hereinafter referred to as "coordinate of an output point") in the line of sight space information corresponding to the user input. The processor 120 can verify the first portion corresponding to the coordinate of the output point in the line of sight space information. The processor 120 can compare the first portion with the user input.

In various embodiments, the coordinate of the output point corresponding to the user input can be independent of a coordinate of an input point which configures the user input. For example, if the user input is a 2D input (e.g., if the user input is present on a plane space), the coordinate of the output point can be a 3D coordinate. On the other hand, although the user input is a 3D input, the coordinate of the output point can be displayed on one plane in a 2D form.

In various embodiments, the processor 120 can identify object information around the derived coordinate of the output point to verify the first portion. In various embodiments, the object information can include depth map information, location information of a corresponding object, contour information of the corresponding object (e.g., a contour about a line of sight of the user), and the like. The object information can include a direction of a surface of the corresponding object.

In various embodiments, the processor 120 can recognize one object using additional information such as a depth map and a color. The processor 120 can define a plurality of objects as one object group using additional information for determining a type of an object and correlation. Also, this process can be omitted.

In various embodiments, the electronic devices can include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices can include at least one of parts of furniture or buildings/ structures, electronic boards, electronic signature receiving devices, projectors, or various measuring instruments (e.g., water meters, electricity meters, gas meters, or wave meters, and the like). The electronic devices according to various embodiments of the present disclosure can be one or more combinations of the above-mentioned devices. The electronic devices according to various embodiments of the present disclosure can be flexible electronic devices. Also, electronic devices according to various embodiments of the present disclosure are not limited to the above-mentioned devices, and can include new electronic devices according to technology development Hereinafter, electronic devices according to various embodiments will be described with reference to the accompanying drawings. The term "user" used herein can refer to a person who uses an electronic device or can refer to a device (e.g., an artificial electronic device) that uses an electronic device.

FIG. 1 is a block diagram illustrating a configuration of an electronic device 101 in a network environment 100 according to various embodiments. In various embodiments, the electronic device 101 can be a wearable device which is wearable on a head of its user. For example, the electronic device 101 can be smart glasses, a head mounted device (HMD).

Referring to FIG. 1, the electronic device 101 in various embodiments can be connected with an external device (e.g., a first external device 102, a second external device 104, or a server 106) over a network 162 or local-area communication 164. The electronic device 101 can include a bus 110, a processor 120, a memory 130, an input/output (I/O) interface 150, a display 160, a communication interface 170, a camera module 180, and a sensor module 190. In various embodiments, at least one of the components can be omitted from the electronic device 101, and another component can be additionally included in the electronic device 101.

The bus 110 can be, for example, a circuit which connects the components 120 to 190 with each other and transmits communication (e.g., a control message and/or data) between the components 120 to 190.

The processor 120 can include one or more of a central processing unit (CPU), an application processor (AP), or a communication processor (CP). For example, the processor 120 can perform calculation or data processing about control and/or communication of at least another of the components of the electronic device 101.

In various embodiments, the processor 120 can generate a three-dimensional (3D) space and can output augmented reality (AR) in which a real object and a virtual object are combined, on the 3D space. The AR can be technologies of overlapping and showing a virtual object with a real world (or a real object) seen by eyes of the user.

According to various embodiments, the processor 120 can use a method of recognizing an object in a marker/markerless manner from actual reality which is captured by the camera module 180 and is then stored in the memory 130 and displaying virtual reality (VR) data on the recognized object or a method of recognizing an object in the marker/markerless manner from actual reality captured in real time by the camera module 180 and selecting and displaying VR data on the recognized object as a method of selecting and displaying an object of actual reality to generate VR data in the actual reality.

According to various embodiments, the processor 120 can recognize line of sight information of the user (or a head pose of the user and camera location information), can recognize input intention information including a gesture of the user, and can recognize an object region and attributes of an object by reading data about n ($1 \leq n \leq N$) real objects among data about N (N>1) real objects using a method of recognizing the N real objects. The processor 120 can assign M (M>1) virtual points for the recognized object region, can configure virtual point combination information including information about the M virtual points and information about an order of virtual point combinations, and read $(n+1)^{th}$ to Nth actual reality data. The processor 120 can determine an object region, which includes i ($1 \leq i \leq M$) or more virtual points corresponding to the virtual point combination information and is matched to combinations of the i virtual points, line of sight information of the user, the input intension information including the gesture, and the order of virtual point combinations j ($1 \leq j \leq M$) times or more, as the same object region as an object region recognized from the nth actual reality data.

Additional information about a process of generating the 3D space and converting the user input using the processor 120 can be provided with reference to FIGS. 2 to 20.

The memory 130 can include a volatile and/or non-volatile memory. The memory 130 can store, for example, a command or data associated with at least another of the components of the electronic device 101.

According to various embodiments, the memory 130 can store data necessary for outputting AR. The data can include data about a real object or data about a virtual object. For example, the data about the real object can include location information of each of real objects included in an image collected by the camera module 180 and distance information and relative distance information from the camera module 180, and the like. The data about the virtual object can include a size and a location of each of virtual objects output together with real objects generated by an input of the user, information about correlation with the real objects, and the like.

According to an embodiment, the memory 130 can software and/or a program 140. The program 140 can include, for example, a kernel 141, a middleware 143, an application programming interface (API) 145, and/or at least one application program 147 (or "at least one application"). At least part of the kernel 141, the middleware 143, or the API 145 can be referred to as an operating system (OS).

The kernel 141 can control or manage, for example, system resources (e.g., the bus 110, the processor 120, or the memory 130, and the like) used to execute an operation or function implemented in the other programs (e.g., the middleware 143, the API 145, or the application program 147). Also, as the middleware 143, the API 145, or the application program 147 accesses a separate component of the electronic device 101, the kernel 141 can provide an interface which can control or manage system resources.

The middleware 143 can play a role as, for example, a go-between such that the API 145 or the application program 147 communicates with the kernel 141 to communicate data.

Also, the middleware 143 can process one or more work requests, received from the at least one application program 147, in order of priority. For example, the middleware 143 can assign priority which can use system resources (the bus 110, the processor 120, or the memory 130, and the like) of the electronic device 101 to at least one of the at least one application program 147. For example, the middleware 143 can perform scheduling or load balancing for the one or more work requests by processing the one or more work requests in order of priority assigned to the at least one of the at least one application program 147.

The API 145 can be, for example, an interface in which the application program 147 controls a function provided from the kernel 141 or the middleware 143. For example, the API 145 can include at least one interface or function (e.g., a command) for file control, window control, image processing, or text control, and the like.

The I/O interface 150 can play a role as, for example, an interface which can send a command or data, input from a user or another external device, to another component (or other components) of the electronic device 101. Also, the I/O interface 150 can output a command or data, received from another component (or other components) of the electronic device 101, to the user or the other external device.

The display 160 can include, for example, a liquid crystal display (LCD), a light emitting diode (LED) display, an organic LED (OLED) display, a microelectromechanical systems (MEMS) display, or an electronic paper display. The display 160 can display, for example, a variety of content (e.g., text, an image, a video, an icon, or a symbol, and the like) to the user. The display 160 can include a touch screen, and can receive, for example, a touch, a gesture, proximity, or a hovering input using an electronic pen or part of a body of the user.

In various embodiments, the display 160 can output AR based on control of the processor 120. For example, if the display 160 is a transparent display (or a display of a see-through type), it can project real objects and can output a virtual object associated with the real objects. For another example, if the display 160 is be of a type (e.g., an opaque type) of outputting an image in which surroundings of the electronic device 101 are captured by the camera module 180, it can output an AR screen in which a virtual object is added to the image in which the surroundings of the electronic device 101 are captured. The display 160 can include an output device which displays VR data on an object on actual reality data and can include one of a normal output device such as a liquid crystal display (LCD) and a transparent output device such as an HMD, glasses, goggles, a window.

In various embodiments, the display 160 can display a 3D VR space, an operation object on the 3D VR space, movement of a 3D virtual object, and contents input by the user to him or her. As the user operates the virtual object using the operation object, the display 160 can visually display motion of the virtual object to him or her.

The communication interface 170 can establish communication between, for example, the electronic device 101 and an external device (e.g., a first external electronic device 102, a second external electronic device 104, or a server 106). For example, the communication interface 170 can connect to the network 162 through wireless communication or wired communication and can communicate with the external device (e.g., the second external electronic device 104 or the server 106).

The wireless communication can use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication can include, for example, the local-area communication 164. The local-area communication 164 can include, for example, at least one of wireless-fidelity (Wi-Fi) communication, Bluetooth (BT) communication, near field communication (NFC) communication, or global navigation satellite system (GNSS) communication, and the like.

An MST module can generate a pulse based on transmission data using an electromagnetic signal and can generate a magnetic field signal based on the pulse. The electronic device 101 can send the magnetic field signal to a point of sales (POS) terminal. The POS terminal can restore the data by detecting the magnetic field signal using an MST reader and converting the detected magnetic field signal into an electric signal.

The GNSS can include, for example, at least one of a global positioning system (GPS), a global navigation satellite system (Glonass), a Beidou navigation satellite system (hereinafter referred to as a "Beidou"), or a Galileo (i.e., the European global satellite-based navigation system) according to an available area or a bandwidth, and the like. Hereinafter, the "GPS" used herein can be interchangeably with the "GNSS". The wired communication can include at least one of, for example, universal serial bus (USB) communication, high definition multimedia interface (HDMI) communication, recommended standard 232 (RS-232) communication, or plain old telephone service (POTS) communication, and the like. The network 162 can include a telecommunications network, for example, at least one of a computer network (e.g., a local area network (LAN) or a wide area network (WAN)), the Internet, or a telephone network.

According to various embodiments, the communication interface 170 can include a communication module which connects to one of a wired communication network and a wireless communication network based on communication standards and a protocol and can perform a function of connecting a communication network with a server (or device) over a communication channel or connecting a communication channel with another AR device. The communication interface 170 can receive actual reality data stored in a server (or a device) on the communication network and can perform a function of obtaining the actual reality data and VR data. The communication interface 170 can transmit user input requirements processed by the processor 120 to another device to share the user input requirements with the other device.

Each of the first and second external electronic devices 102 and 104 can be the same as or different device from the electronic device 101. According to an embodiment, the server 106 can include a group of one or more servers. According to various embodiments, all or some of operations executed in the electronic device 101 can be executed in another electronic device or a plurality of electronic devices (e.g., the first external electronic device 102, the second external electronic device 104, or the server 106). According to an embodiment, if the electronic device 101 should perform any function or service automatically or according to a request, it can request another device (e.g., the first external electronic device 102, the second external electronic device 104, or the server 106) to perform at least part of the function or service, rather than executing the function or service for itself or in addition to the function or service. The other electronic device (e.g., the first external electronic device 102, the second external electronic device 104, or the server 106) can execute the requested function or the added function and can transmit the executed result to the electronic device 101. The electronic device 101 can process the received result without change or additionally and can provide the requested function or service. For this purpose, for example, cloud computing technologies, distributed computing technologies, or client-server computing technologies can be used.

In various embodiments, each of the first and second external electronic devices 102 and 104 can be used as a device which provides an input to AR. For example, if the user generates an input through a 2D display of the first and second external electronic devices 102 and 104, information about the input can be transmitted to the electronic device 101. The electronic device 101 can convert the input into an input on a 3D space and can generate a virtual object corresponding to the converted input. Additional information about the input using the first and second external electronic devices 102 and 104 can be provided with reference to FIGS. 15 to 18.

The camera module 180 can collect image data in real time from an AR output. The camera module 180 can include at least one red, green, and blue (RGB) cameras, an infrared (IR) camera, a depth camera, or a thermal camera. In various embodiments, the image data can be generated by combining data collected by a plurality of cameras.

For example, the camera module 180 can include an IR output device and an IR camera. The IR output device can emit infrared rays to an object around the electronic device 101, and the IR camera can sense infrared rays reflected from the object.

The sensor module 190 can include a device which obtains an analog or digital signal type of a sensor signal from one sensor. The sensor module 190 can include an electric signal sensor which generates an electric signal (e.g., resistance, current, and voltage) based on an environment change and a camera sensor which selectively obtain only specific data necessary for a sensor input among actual reality data after obtaining the actual reality data together with the camera module 180. In various embodiments, if including the camera sensor, the sensor module 190 can be integrated with the camera module 180.

FIG. 2 is a drawing illustrating a wearable device according to various embodiments. In various embodiments, an electronic device 201 or 202 of FIG. 2 can be an electronic device 101 of FIG. 1.

In FIG. 2, an embodiment is exemplified as the electronic device 201 or 202 is smart glasses or an HMD. However, embodiments are not limited thereto. For example, the electronic device 201 or 202 can be a device such as a smartphone or a tablet. A user can hold the device such as the smartphone or the tablet and can capture surroundings using a depth camera. The user can add a virtual object to an image using a user input while checking a screen.

Referring to FIG. 2, the electronic device 201 can be a smart glasses type of device which provides AR. The electronic device 201 can include a display 210 on its front surface. In an embodiment, the display 210 can be implemented with a transparent display (or a see-through type of a display). The display 210 can reflect a real object around the electronic device 201 and can output a virtual object associated with the real object. The user can wear the electronic device 201 in the form of glasses and can check AR on the display 210. In various embodiments, the display 210 can operate in such a manner (e.g., an opaque manner) as to capture a real object using a camera module 211 and output the captured image to eyes of the user. The display 210 can output an AR screen in which a virtual object is added to an image where surroundings of the electronic device 101 are captured.

The electronic device 201 can include the camera module 211. The camera module 211 can be a camera module 180 of FIG. 1. The camera module 211 can collect an image in which a real object around the electronic device 201 is captured. In various embodiments, the camera module 211 can be arranged at a front surface of the electronic device 201 in a direction where the user sees the outside. Line of sight information of the user (e.g., a direction in which a line of sight of the user is oriented) can be identical to a direction of the camera module 211. The line of sight information of the user can be determined using location information of the camera module 211.

In an embodiment, the camera module 211 can be a stereo camera. The stereo camera can capture one object to simultaneously obtain two images by mounting two capturing lenses. In another embodiment, the camera module 211 can include an IR output device and an IR camera. The IR output device can emit infrared rays to an object around the electronic device 201, and the IR camera can sense infrared rays reflected from the object.

In various embodiments, an image collected by the camera module 211 can be used to generate a depth map and recognize a gesture of the user. Also, the camera module 211 can be used for 3D modeling/mapping of an object around the electronic device 201.

The electronic device 202 can be an HMD which is worn on a head of the user and checks a display arranged before his or her eyes. In various embodiments, the electronic device 202 can be of a shape in which a display device (e.g., a smartphone) and a fixing part for fixing the display device are combined. The user can use the electronic device 202 in such a manner as to mount the smartphone on the fixing part and putting the fixing part on his or her head.

According to various embodiments, the electronic device 202 can include a camera module 221. The camera module 221 can be the camera module 180 of FIG. 1. The camera module 221 can collect an image in which a real object around the electronic device 202 is captured. The camera module 211 can be arranged at a front surface of the electronic device 202 in a direction where the user sees the outside. For example, the camera module 211 can be a rear camera of a smartphone.

According to various embodiments, the camera module 211 or 221 can include at least one or more RGB cameras, an IR camera, a depth camera, or a thermal camera. A processor in the electronic device 201 or 202 can obtain depth map information and an RGB image for an object around the electronic device 201 or 202 using the camera module 211 or 221. The processor can extract one or more objects from the obtained information based on an input of the user or a request from an external device or automatically to generate object information. For example, the object information can include at least part of depth map information of part of the at least appearance of an object, an external characteristic (e.g., a color, a size, and the like) of the object, absolute and relative locations of the object, and a boundary (e.g., a contour line and a surface) of the object.

FIG. 3A is a block diagram illustrating a detailed configuration of a processor according to various embodiments. In FIG. 3A, an embodiment is exemplified as components are classified according to a function. However, embodiments are not limited thereto. For example, the components can be integrated with each other or are separated from each other. In various embodiments, each of the components can be a function or a program module stored in a memory. A processor 301 can be a processor 120 of FIG. 1.

The processor 301 can include an image input unit 301a, an image correcting unit 301b, an image information collecting unit 301c, a space reconstructing unit 301d, a virtual object modeling unit 301e, a space matching unit 301f, and an operation processing unit 301g.

The image input unit 301a can receive image information with respect to an operation object (e.g., a finger end) used by a user to operate a virtual object and surroundings seen from a line of sight of the user, via a camera module. The camera module can include at least one of a color camera, a depth camera, a thermal camera, and an IR camera. The camera module can be of a form where a plurality of cameras are combined. The image input unit 301a can receive a color image or a depth image for the operation object and the surroundings.

The image correcting unit 301b can correct image information of the operation object and the surroundings, obtained by a camera, such that a line of sight of the camera module is identical to a line of sight of the user who uses the operation object. The image correcting unit 301b can obtain accurate relative location relationship information between eyes of the user and the operation object. The obtained relative location relationship information between the eyes of the user and the operation object can be used as information to ascertain a relative location relationship between a virtual object and the operation object in a 3D VR space to which a 3D rendering space including the virtual object is matched.

The image information collecting unit 301c can read input image data and can extract a hue/saturation, a depth, and a contour information value of a specific object from the read image data. The image information collecting unit 301c can read the extracted hue/saturation and can detect a boundary line of a region classified relative to the hue/saturation. The image information collecting unit 301c can connect and combine the detected boundary lines, can recognize one or more object regions, each of which has a geometric structure, and can recognize the object region as an object to output VR data.

The space reconstructing unit 301d can reconstruct a 3D VR space for the surroundings including the operation object using image information input through the image input unit 301a. The space reconstructing unit 301d can implement surroundings in a real world where the user moves the operation object to operate a virtual object on AR or VR as a virtual 3D space and can ascertain location information of the operation object on the implemented virtual 3D space. The operation object used by the user can be modeled as a 3D virtual operation object by the space reconstructing unit 301d, and location information on the 3D VR space can be represented as a 3D coordinate based on movement on the real world.

The virtual object modeling unit 301e can model a virtual model operated by the operation object used by the user to generate a 3D virtual rendering space including the modeled virtual object. Location information of the virtual object modeled by the virtual object modeling unit 301e can be represented as a 3D coordinate on the 3D rendering space. Also, the virtual object modeling unit 301e can add physical characteristic information in a weightless state of a virtual object to model the virtual object.

The space matching unit 301f can match the 3D rendering space generated by the virtual object modeling unit 301e to a 3D VR space for surroundings of the user, reconstructed by the space reconstructing unit 301d and can calculate relative location relationship information between an operation object and a 3D virtual object on the 3D VR space.

The operation processing unit 301g can determine whether the user operates a virtual object on a VR object and space calculated by the virtual object modeling unit 301e or the space reconstructing unit 301d. Also, if it is determined that a user input of the virtual object is requested, the operation processing unit 301g can execute a function of the virtual object corresponding to user input requirements. The operation processing unit 301g can correspond to an input operation of the user based on relative location and size relationship information between the operation object and the virtual object.

FIG. 3B is a flowchart illustrating an AR generation method according to various embodiments.

Referring to FIG. 3B, in operation 301, a processor 120 of FIG. 1 can collect image information generated by capturing surroundings including an operation object (e.g., part of a body of a user) using a camera module 180 of FIG. 1.

In operation 302, the processor 120 can collect and reconstruct information about surroundings of an electronic device 101 of FIG. 1 and a detected object using the collected image information.

In operation 303, the processor 120 can reconstruct a 3D VR space for the surroundings of the electronic device 101 using the collected image information.

In operation 304, the processor 120 can model a 3D virtual object operated by the operation object and can generate a 3D rendering space including the 3D virtual object.

In operation 305, the processor 120 can match the 3D rendering space to the 3D VR space.

In operation 306, the processor 120 can determine whether a user input on the 3D virtual object occurs and can process motion of the 3D virtual object in response to the user input.

FIG. 3C is a flowchart illustrating an AR output method according to various embodiments.

Referring to FIG. 3C, in operation 310, a processor 120 of FIG. 1 can generate line of sight information of a user of an electronic device 101 of FIG. 1 based on at least one of a sensor module 190 or a camera module 180 of FIG. 1. In an embodiment, the line of sight information can be identical to a direction of the camera module 180. The line of sight information of the user can be determined using information about a location or direction of the camera module 180. In another embodiment, the line of sight information can be determined through a direction of a head of a user or a direction of his or her pupils, recognized via the sensor module 190.

In operation 320, the processor 120 can extract line of sight information corresponding to the line of sight information of the user from 3D space information corresponding to a real object around the user based on the line of sight information.

In various embodiments, the processor 120 can generate the 3D space information corresponding to the real object around the user based on an image captured by the camera module 180 or information provided from an external device (e.g., a server 106 in FIG. 1). For example, the 3D space information can include information about a location, a size, and the like of an object recognized by recognizing an object from an image captured by the camera module 180.

In various embodiments, the processor 120 can extract line of sight space information corresponding to a line of sight of the user. The line of sight space information can be 3D space information of a region corresponding to line of sight space information of the user based on at least one of the sensor module 190 or the camera module 180 in the 3D space information.

In operation 330, the processor 120 can recognize a user input using the camera module 180 or the sensor module

190. The user input can be an input for generating a virtual object, on a 3D space according to the line of sight space information.

For example, the user input can be menu selection on a graphic user interface (GUI). For another example, the user input can be an input according to a specific gesture or a specific input pattern of the user.

In various embodiments, the user input can include at least one of a point input (e.g., selection of a specific point of an object with a finger) or a stroke input (e.g., movement of a finger from a first point to a second point).

In an embodiment, if the user wears an HMD type of an electronic device 101, the processor 120 can start to recognize a user input. In another embodiment, if the electronic device 101 is powered on or if a specific application is executed, the processor 120 can start to recognize a user input.

In various embodiments, waiting for inputting the user input can be waiting after one of a point input or a stroke input is selected. A method of selecting the one of the point input or the stroke input can include a GUI input, an input pattern of the user, and a previous gesture of the user. The point input or the stroke input can be selected based on a type of a first input during the waiting for inputting the user input.

The processor 120 can recognize a user input of the user using the camera module 180 or the sensor module 190. The user input can be represented as a 2D coordinate or a 3D coordinate. In various embodiments, the user input can include at least one of a point input, a stroke input, or a looped curve input. In various embodiments, the user input can be a 3D input (e.g., a stroke input on a virtual space) or a 2D input (e.g., a swipe input on a 2D display screen).

According to various embodiments, the processor 120 can derive attributes information of the user input. The attributes information can include a type of the user input (e.g., a point input, a stroke input, and a looped curve input) and user input location information (e.g., a start point, a movement direction, and an end point). For example, the attributes information can include a coordinate of the user input, a curvature radius, a feature of a curved point (e.g., a pole, an inflection point, and the like), a location of the pole, a radius of a circle, and a length of each of a major axis and a minor axis of an oval, and the like. In addition, the attributes information can include attributes which can represent a various patterns.

In various embodiments, an origin point for recognizing the user input can be a line of sight of the user and can be one point (e.g., the center of a 2D display) corresponding to an input plane (on the 2D display).

In various embodiments, attributes of the input plane of the user can be changed based on a line of sight of the user (e.g., a head pose of the user or a direction of a camera). The attributes of the input plane of the user can be changed based on a physical feature or situation of the user. The attributes of the user plane can include a 2D or 3D coordinate, a size, and the like.

In operation 340, the processor 120 can compare a first portion of the line of sight space information with the user input. The processor 120 can derive a coordinate of a corresponding point (hereinafter referred to as "coordinate of an output point") in the line of sight space information corresponding to the user input. The processor 120 can verify the first portion corresponding to the coordinate of the output point in the line of sight space information. The processor 120 can compare the first portion with the user input.

In various embodiments, the coordinate of the output point corresponding to the user input can be independent of a coordinate of an input point which configures the user input. For example, if the user input is a 2D input (e.g., if the user input is present on a plane space), the coordinate of the output point can be a 3D coordinate. On the other hand, although the user input is a 3D input, the coordinate of the output point can be displayed on one plane in a 2D form.

In various embodiments, the processor 120 can identify object information around the derived coordinate of the output point to verify the first portion. In various embodiments, the object information can include depth map information, location information of a corresponding object, contour information of the corresponding object (e.g., a contour about a line of sight of the user), and the like. The object information can include a direction of a surface of the corresponding object.

In various embodiments, the processor 120 can recognize one object using additional information such as a depth map and a color. The processor 120 can define a plurality of objects as one object group using additional information for determining a type of an object and correlation. Also, this process can be omitted.

In an embodiment, the processor 120 can extract a second portion in the 3D space information included in a range corresponding to a path of a user input and can measure a distance between the second portion and the path of the user input. For example, if a plane normal vector corresponding to the path of the user input is $\overline{x}$ and if a plane normal vector corresponding to the second portion is $\overline{y}$, a distance between the path of the user input and the second portion can be calculated through a vector inner product ($\overline{x} \cdot \overline{y}$).

In another embodiment, the processor 120 can calculate plane information including the path of the user input. The processor 120 can extract the second portion in the 3D space information included in a range corresponding to the path of the user input from the 3D space information and can compare plane information of the second portion with plane information including the path of the user input.

In operation 350, the processor 350 can correct the user input based on comparing the plane information of the second portion with the plane information to generate the corrected input information.

According to various embodiments, the processor 120 can modify a set of corresponding points by a stroke input using surface information of an object. As an embodiment, the processor 120 can draw a set of corresponding points based on the surface information of the object. As another example, the processor 120 can draw a set of corresponding points based on contour information of an object. As another embodiment, the processor 120 can draw a set of corresponding points to be parallel or perpendicular to a plane on which an object is located.

In operation 360, the processor 120 can generate a first virtual object based on the corrected input information. The processor 120 can derive a coordinate of an output point using object information to generate the first virtual object. In various embodiments, the processor 120 ma combine object information with the user input and can determine attributes (e.g., a coordinate, a direction, and the like) of the virtual object. Additional information about determining the attributes of the virtual object can be provided with reference to FIG. 9.

In operation 370, the processor 120 can output the first virtual object on a display 160 of FIG. 1. The processor 120 can output the first virtual object on a 3D space. The user can identify, modify, or delete the generated first virtual object.

The user can move the generated first virtual object to another coordinate on a 3D space or can send information about the generated first virtual object to an external device.

An AR output method according to various embodiments can include generating line of sight information of a user of an electronic device based on at least one of a sensor module or a camera module of the electronic device, extracting line of sight space information corresponding to the line of sight information of the user from 3D space information corresponding to a real object around the user based on the line of sight information, recognizing a user input using the camera module or the sensor module, comparing a first portion of the line of sight space information with the user input, generating compensated input information by compensating the user input based on comparing the first portion with the user input, generating a first virtual object based on the compensated input information, and outputting the first virtual object on a display of the electronic device.

According to various embodiments, the extracting of the line of sight space information can include generating the 3D space information based on the sensor module or the camera module.

According to various embodiments, the generating of the 3D space information can include capturing surroundings of the electronic device using the camera module including at least one of a color camera, a depth camera, a thermal camera, or an IR camera. The generating of the 3D space information can include generating the 3D space information including a line, a polyline, a curve, a polygon, a circle, an oval, and text information.

According to various embodiments, the recognizing of the user input can include recognizing a gesture or a specified input pattern of the user as the user input. The recognizing of the user input can include recognizing the user input by one of a point input or a stroke input.

According to various embodiments, the comparing of the first portion and the user input can include extracting a second portion in the 3D space information included in a range corresponding to a path of the user input from the 3D space information and measuring a distance between the second portion and the path of the user input.

According to various embodiments, the comparing of the first portion and the user input can include calculating plane information including a path of the user input, extracting a second portion in the 3D space information included in a range corresponding to a path of the user input from the 3D space information, and comparing plane information of the second portion with plane information including the path of the user input.

According to various embodiments, the comparing of the first portion and the user input can include verifying a corresponding point where the real object is met or adjacent to an extension line of connecting a location of a line of sight of the user with each of points which configure the user input.

According to various embodiments, the verifying of the corresponding point can include determining a point, where a surface or contour of the real object is adjacent to the extension line, as the corresponding point.

According to various embodiments, the generating of the first virtual object can include generating the first virtual object if it is determined that the first portion in the 3D space information is similar to the user input based on similarity between the first portion and the user input.

According to various embodiments, the generating of the first virtual object can include matching each of points of the user input on a 2D plane to a corresponding point of a 3D space based on surface information or contour information of the real object.

According to various embodiments, the matching to the corresponding point of the 3D space can be determined based on a virtual object which is present on an extension line of connecting a line of sight of the user with the user input or the periphery of the extension line.

According to various embodiments, the generating of the first virtual object can include arranging the virtual object relative to an axis or surface parallel to a central axis or a central surface of the real object.

According to various embodiments, the generating of the first virtual object can include generating a virtual object which is extended from a boundary of the real object and forms a specified angle with the boundary of the real object.

According to various embodiments, the recognizing of the user input can include recognizing the user input of connecting a first object with a second object. The generating of the first virtual object can include generating the first virtual object of connecting a connection point of the first object with a connection point of the second object using a line according to specified attributes.

According to various embodiments, the generating of the first virtual object can include changing attributes of the first virtual object based on a change of the attributes if it is determined that the attributes of the first object are changed.

Figure 4:
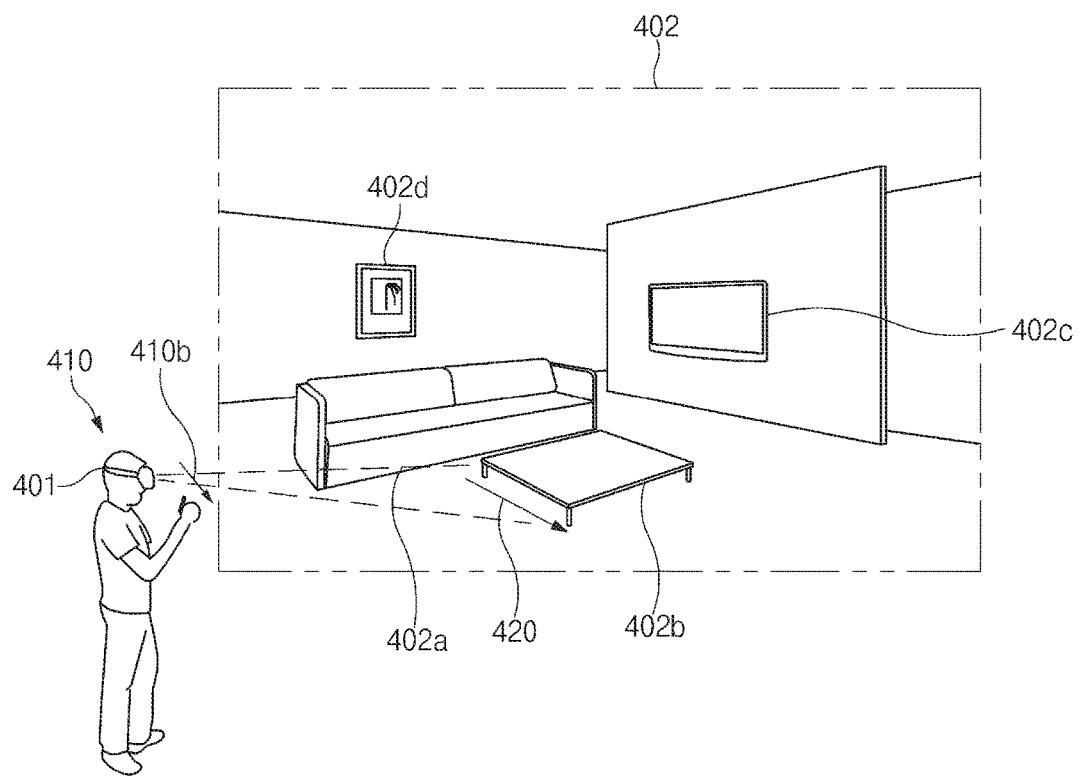
FIG. 4 illustrates an example of a screen using AR according to various embodiments.

FIG. 4 is a drawing illustrating an example of a screen using AR according to various embodiments.

Referring to FIG. 4, a user 410 can wear an electronic device 401 which is a wearable device on his or her head and can check an object around the electronic device 401.

The electronic device 401 can generate a 3D space 402 based on an image captured using its camera module. For example, the electronic device 401 can recognize first to fourth real objects 402a to 402d on a line of sight of the user 410. The electronic device 401 can store information about a distance between the first to fourth real objects 402a to 402d, a boundary of each of the first to fourth real objects 402a to 402d, and the like.

The electronic device 401 can recognize a user input 410b of the user 410. The electronic device 401 can recognize an operation object (e.g., a finger end) using a sensor module or the camera module. The electronic device 401 can generate a virtual object 420 on a line parallel to a boundary of a real object or a surface parallel to one surface of the real object based on a direction of a line of sight and a movement direction of the user input 410b.

In FIG. 4, the virtual object 420 parallel to one side of the second real object 402b can be generated based on the user input 410b of the user 410. Although shaking occurs in a process where the user 410 generates the user input 410b, the virtual object 420 can maintain a state where it is parallel to one side of the second real object 402b.

FIGS. 5 to 8 are drawings illustrating an example of generating a virtual object based on real object information according to various embodiments. In FIGS. 5 to 8, if a user input of a user occurs between a line of sight direction of the user (or a direction of a camera of an electronic device) and a rear object, a virtual object associated with the real object can be drawn on a 3D space based on attributes of the user input and a form or arrangement of the real object.

Figure 5:
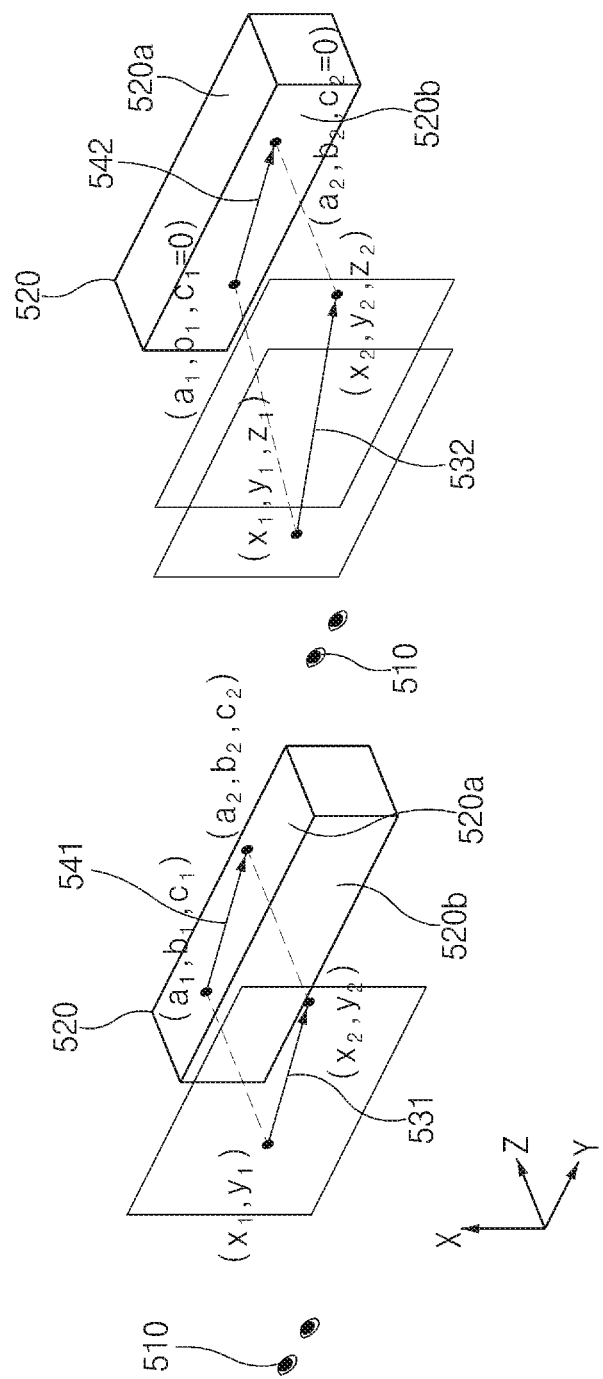
FIGS. 5, 6, 7, and 8 are drawings illustrating examples of generating virtual objects based on real object information according to various embodiments.

Referring to FIG. 5, a user input 531 or 532 of the user can occur between a line of sight 510 of the user (e.g., a direction of a camera) and a real object 520. For example, the user input 531 or 532 can be a gesture where the user moves part (e.g., a finger) of his or her body and draws a line on the air.

A location of a drawn virtual object 541 or 542 can be determined based on attributes (e.g., a start point, an end point, a movement distance, a movement direction, a movement speed, and the like) of the user input 531 or 532 and a direction of the line of sight 510 of the user. The virtual object 541 or 542 can be generated on a point where an extension line of connecting the line of sight 510 of the user with each of points of the user input 531 or 532 is intersected with a surface of the real object 520.

In an embodiment, the user can generate the user input 531 in a 2D form. The user input 531 can be a stroke input moved from (x1, y1) coordinates to (x2, y2) coordinates. The real object 520 can be arranged on a location which is lower in a Y-axis direction than the line of sight 510 of the user (e.g., a location where the user looks down the real object 520). In this case, the virtual object 541 can be included in an upper surface 520a of the real object 520 and can be drawn by a straight line parallel to the upper surface 520a. In various embodiments, although the user input 531 is of a 2D form, the virtual object 541 can be three-dimensionally drawn. If the user input 531 moves between the (x1, y1) coordinates to the (x2, y2) coordinates, the virtual object 541 can be drawn from (a1, b1, c1) coordinates to (a2, b2, c2) coordinates.

In another embodiment, the user can generate the user input 532 in a 3D form. The user input 532 can be a stroke input moved from (x1, y1, z1) coordinates to (x2, y2, z2) coordinates. The real object 520 can be arranged in the same or similar location to a line of sight 520 of the user in a Y-axis direction (e.g., a location where the user is faced with the real object 520 at the same height). In this case, the virtual object 542 can be included in a side 520b of the real object 520 and can be drawn by a straight line parallel to the side 520b. In various embodiments, although the user input 532 is three-dimensionally moved, the virtual object 542 can be two-dimensionally drawn. For example, although the user input 532 moves between the (x1, y1, z1) coordinates and the (x2, y2, z2) coordinates, the virtual object 542 can be drawn from (a1, b1, c1) coordinates to (a2, b2, c1) coordinates.

If the user wants to draw a line or a curve on a surface of the real object 520, the virtual object 541 or 542 can be arranged in consideration of a surface form of the real object 520.

Figure 6:
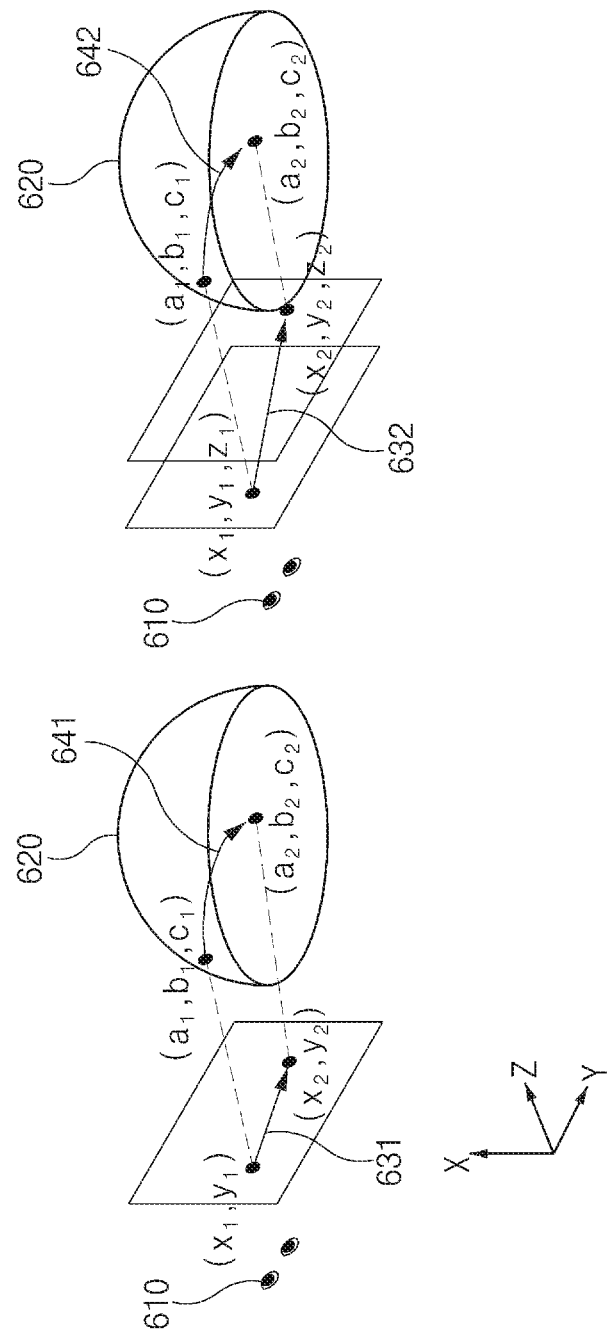

Referring to FIG. 6, a user input 631 or 632 of a user can occur between a line of sight 610 of the user (e.g., a direction of a camera module) and a real object 620. For example, the user input 631 or 632 can be a gesture where the user moves part (e.g., a finger) of his or her body and draws a line on the air. A location of a drawn virtual object 641 or 642 can be determined based on attributes (e.g., a start point, an end point, a movement distance, a movement direction, a movement speed, and the like) of the user input 631 or 632 and a direction of the line of sight 610 of the user. The virtual object 641 or 642 can be generated on a point where an extension line of connecting the line of sight 610 of the user with each of points of the user input 631 or 632 is intersected with a surface of the real object 620.

In various embodiments, although the user input 631 or 632 of the user is a straight line, the virtual object 641 or 642 can be drawn in a curved form based on a surface form of the real object 620.

In an embodiment, although the user input 631 of the user is a 2D input, a 3D virtual object 641 can be drawn based on a surface of the real object 620 of a hemispherical shape. For example, the user input 631 can be a stroke input of a straight-line shape, which is moved from (x1, y1) coordinates to (x2, y2) coordinates. The virtual object 641 corresponding to the user input 631 can have a curved shape drawn from (a1, b1, c1) coordinates to (a2, b2, c2) coordinates.

In another embodiment, if the user input 632 of the user is a 3D input, the virtual object 642 can be drawn along a surface of the real object 620 of a hemispherical shape. For example, the user input 632 can be a stroke input of a straight-line shape, which is moved from (x1, y1, z1) coordinates to (x2, y2, z2) coordinates. The virtual object 642 corresponding to the user input 632 can have a curved shape drawn from (a1, b1, c1) coordinates to (a2, b2, c2) coordinates.

Figure 7:
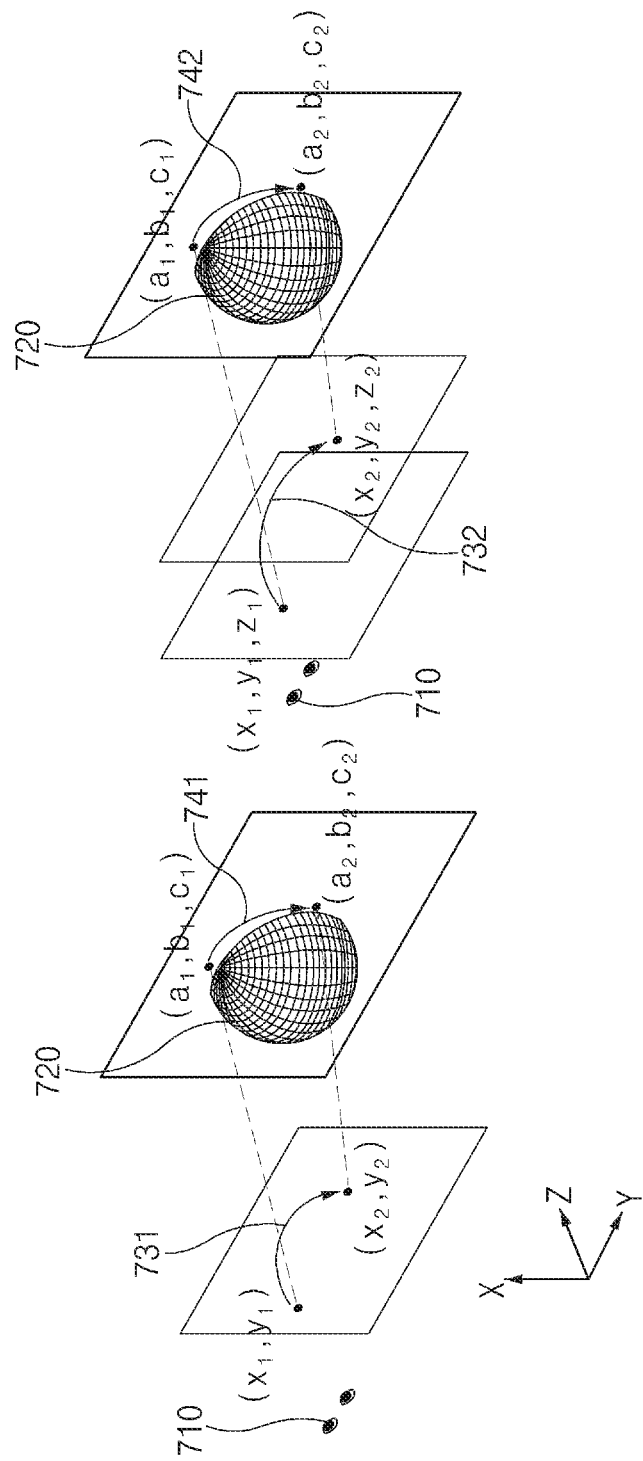

Referring to FIG. 7, a user input 731 or 732 of a user can occur between a line of sight 710 of the user (e.g., a location of a camera module) and a real object 720. For example, the user input 731 or 732 can be a gesture where the user moves part (e.g., a finger) of his or her body and draws a curve on the air. A location of a drawn virtual object 741 or 742 can be determined based on attributes (e.g., a start point, an end point, a movement distance, a movement direction, a movement speed, and the like) of the user input 731 or 732 and a direction of the line of sight 710 of the user.

In various embodiments, the virtual object 741 or 742 can occur on the most similar contour plane from a point where an extension line of connecting the line of sight 710 of the user with each of points of the user input 731 or 732 is intersected with a surface of the real object 720. The most similar plane to a contour of an object seen by the user can be selected, and the virtual object 741 or 742 can be generated on the corresponding plane. In various embodiments, it can be necessary for a process of selecting the contour plane.

In an embodiment, although the user input 731 of the user is a 2D input, the 3D virtual object 741 can be drawn along a surface of the real object 720 of a hemispherical shape. For example, the user input 731 can be a stroke input of a curved shape, which is moved from (x1, y1) coordinates to (x2, y2) coordinates. The virtual object 741 corresponding to the user input 731 can be drawn from (a1, b1, c1) coordinates to (a2, b2, c2) coordinates. In various embodiments, the c1 coordinate is the same as the c2 coordinate. In this case, all of points which configure the virtual object 741 can be arranged at the same distance from the line of sight 710 of the user on a Z-axis.

In another embodiment, although the user input 732 of the user is a 3D input, the virtual object 742 can be drawn from (a1, b1, c1) coordinates to (a2, b2, c2) coordinates along a contour plane of the real object 720.

Figure 8:
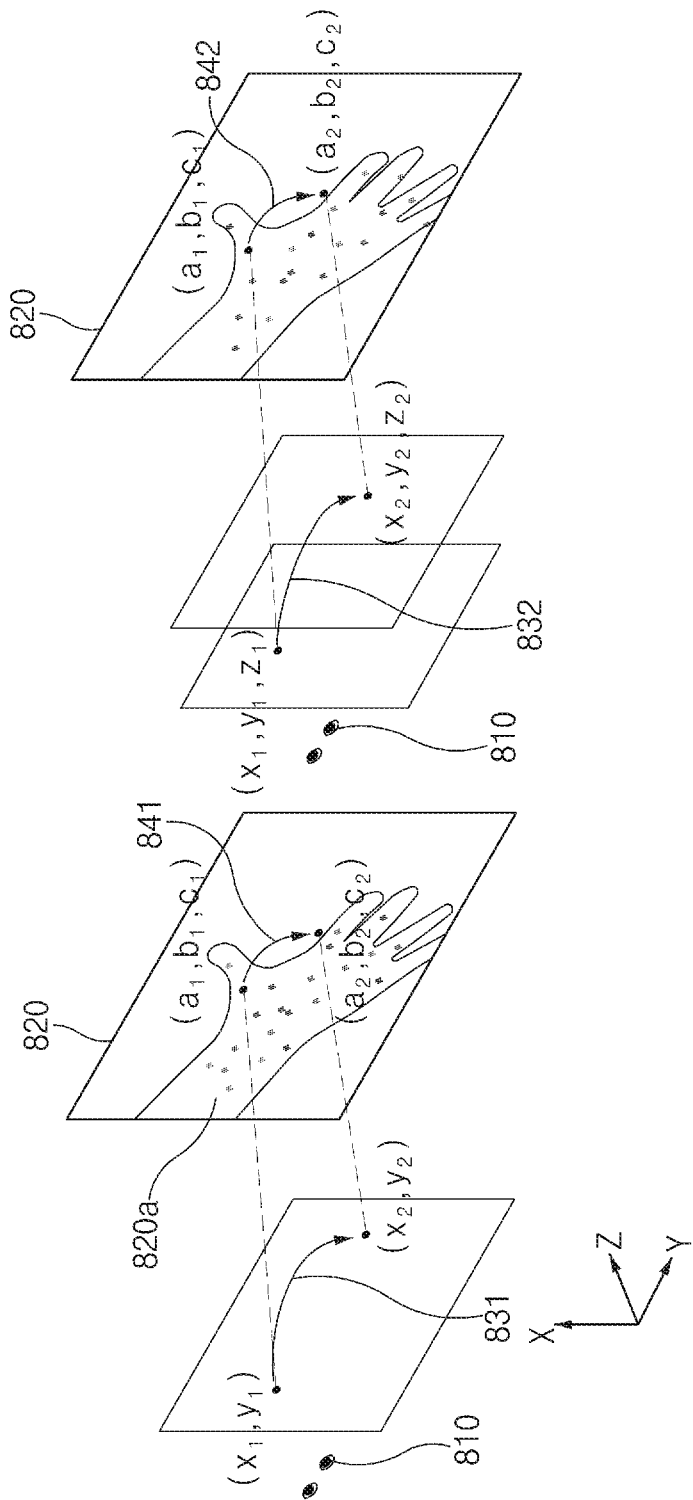

Referring to FIG. 8, a user input 831 or 832 of a user can occur between a line of sight 810 of the user (e.g., a location of a camera module) and a real object 820. For example, the user input 831 or 832 can be a gesture where the user moves part (e.g., a finger) of his or her body and draws a curve on the air. A location of a drawn virtual object 841 or 842 can be determined based on attributes (e.g., a start point, an end point, a movement distance, a movement direction, a movement speed, and the like) of the user input 831 or 832 and a direction of the line of sight 810 of the user.

In various embodiments, the virtual object 841 or 842 can occur through the closest point among point clouds where an extension line of connecting the line of sight 710 of the user with each of points of the user input 731 or 732 is present on the real object 820. It should not be required for the point to be present on a surface of the real object 820.

In an embodiment, although the user input 831 of the user is a 2D input, the 3D virtual object 841 can be drawn between points of the real object 820 represented in the form of point clouds. For example, the user input 831 can be a stroke input of a curved shape, which is moved from (x1, y1) coordinates to (x2, y2) coordinates. The virtual object 841 corresponding to the user input 831 can be drawn from (a1, b1, c1) coordinates to (a2, b2, c2) coordinates among point clouds of the real object 820.

In another embodiment, if the user input 832 of the user is a 3D input, the virtual object 842 can be drawn from (a1, b1, c1) coordinates to (a2, b2, c2) coordinates among point clouds of the real object 820.

Figure 9:
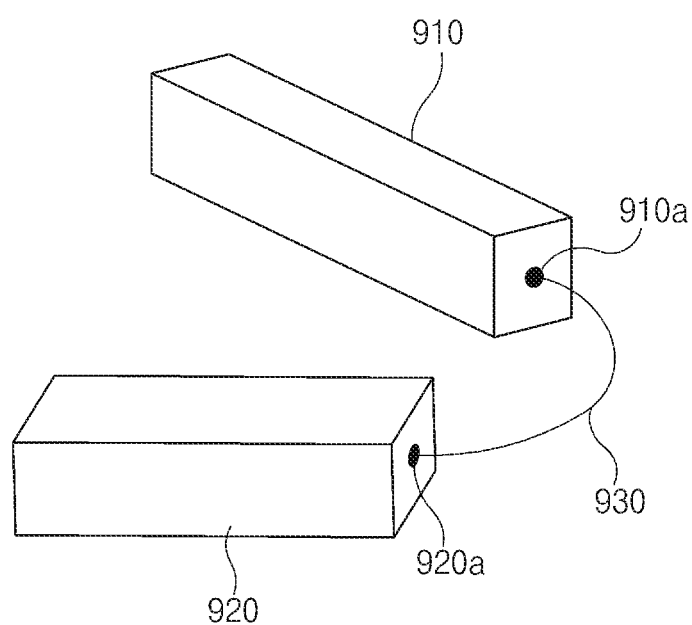
FIG. 9 is a drawing illustrating an example of determining attributes of a virtual object based on object information according to various embodiments.

FIG. 9 is a drawing illustrating an example of determining attributes of a virtual object based on object information according to various embodiments.

Referring to FIG. 9, a processor 120 of FIG. 1 can combine recognized real object information with an input of a user to generate a virtual object 930.

As an embodiment, two points 910a and 920a can be recognized as inputs of the user. If the point inputs are for selecting a surface of a first real object 910 and a surface of a second real object 920, the processor 120 can connect the corresponding two surfaces.

As another embodiment, if determining that the start point 910a and the end point 920a of one stroke input are for selecting the surface of the first real object 910 and the surface of the second real object 920, the processor 120 can connect the corresponding two surfaces.

As another embodiment, a line of connecting the first real object 910 with a surface of the second real object 920 can be drawn to be always perpendicular to the surface.

Figure 10:
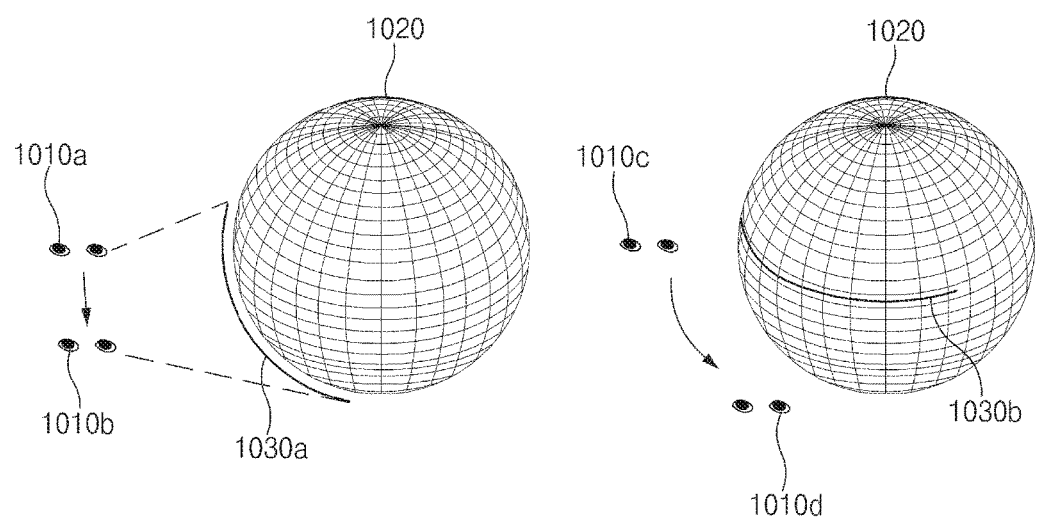
FIG. 10 illustrates example arrangement of a virtual object according to various embodiments.

In various embodiments, if the user connects the first real object 910 with the second real object 920 by one stroke input, the processor 120 can connect the first real object 910 with the second real object 920 in a specified form (e.g., part of a circle or oval). The processor 120 can calculate curvature corresponding to an average value and can draw the virtual object 930 as part of an oval or circle according to the corresponding curvature. In various embodiments, if a stroke input of the user is close to a linear form, the processor 120 can connect the first real object 910 with the second real object 920 in the linear form. FIG. 10 is a drawing illustrating arrangement of a virtual object according to various embodiments.

Referring to FIG. 10, a virtual object 1030a or 1030b can be arranged in various methods based on line of sight information (e.g., a change direction of a line of sight, a change degree of the line of sight, and the like) of a user and attributes of a user input of the user.

The virtual object 1030a can be displayed along a contour of a real object 1020. If a line of sight of the user (e.g., a location of a camera module) is moved from a first location 1010a to a second location 1010b along the contour of the real object 1020, the virtual object 1030a can be displayed along the contour of the real object 1020. A processor 120 of FIG. 1 can verify that an extension line of connecting the line of sight of the user with the user input of the user is moved along the contour of the real object 1020 and can arrange the virtual object 1030a.

The virtual object 1030b can be displayed along a surface of the real object 1020. If a line of sight of the user (e.g., a location of the camera module) is moved from a first location 1010c to a second location 1010d along the surface of the real object 1020, the virtual object 1030b can be arranged along the surface of the real object 1020. The processor 120 can verify that an extension line of connecting the line of sight of the user with a user input of the user crosses the surface of the real object 1020 and can arrange the virtual object 1030a.

In various embodiments, if a user input of the user for generating a virtual object is greater than a specified length, the processor 120 can determine a location where the virtual object is arranged, using line of sight information of the user. For example, the processor 120 can generate a virtual object based on only an input change of the user with respect to an input with a relatively short movement distance and can generate a virtual object in consideration of both of a location change of a line of sight of the user and a change of an input of the user with respect to an input with a relatively long movement distance.

Figure 11:
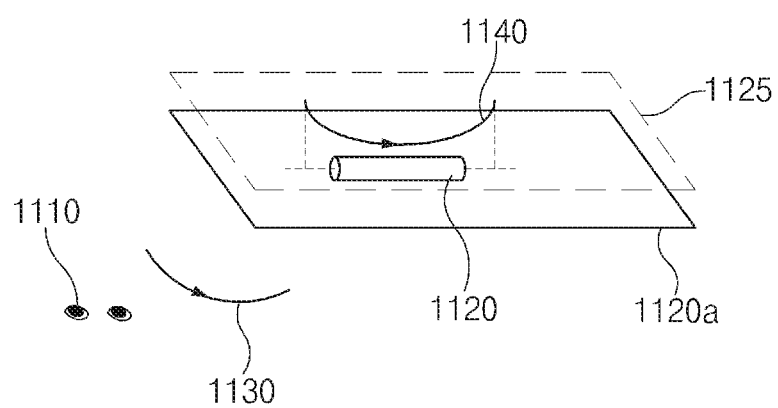
FIG. 11 illustrates an example of arranging a virtual object on an adjacent plane of a real object according to various embodiments.

FIG. 11 is a drawing illustrating an example of arranging a virtual object on an adjacent plane of a real object according to various embodiments.

Referring to FIG. 11, a processor 120 of FIG. 1 can arrange a virtual object 1140 on an axis or surface parallel to a central axis or a central surface of a real object 1120.

In various embodiments, the virtual object 1140 can be arranged on a second plane 1125 parallel to a first plane 1120a on which the real object 1120 is located. For example, if an extension line of connecting a line of sight 110 of a user with a user input 1130 of the user connects a first point with a second point of the same real object 1120 by a curve, the processor 120 can determine that the user intends to rotate the real object 1120.

The processor 120 can measure a degree of parallelization between the virtual second plane 1125 on which an input curve of the user is present and the first plane 1120a on which the peripheral object 1120 (or a 3D modeling virtual object) is arranged. If it is determined that the virtual second plane 1125 is parallel to the first plane 1120a within a range, the processor 120 can generate the virtual object 1140 corresponding to the input curve such that the virtual second plane 1125 is accurately parallel to the first plane 1120a. The processor 120 can use ambient information such as a voice during an input operation.

Figure 12:
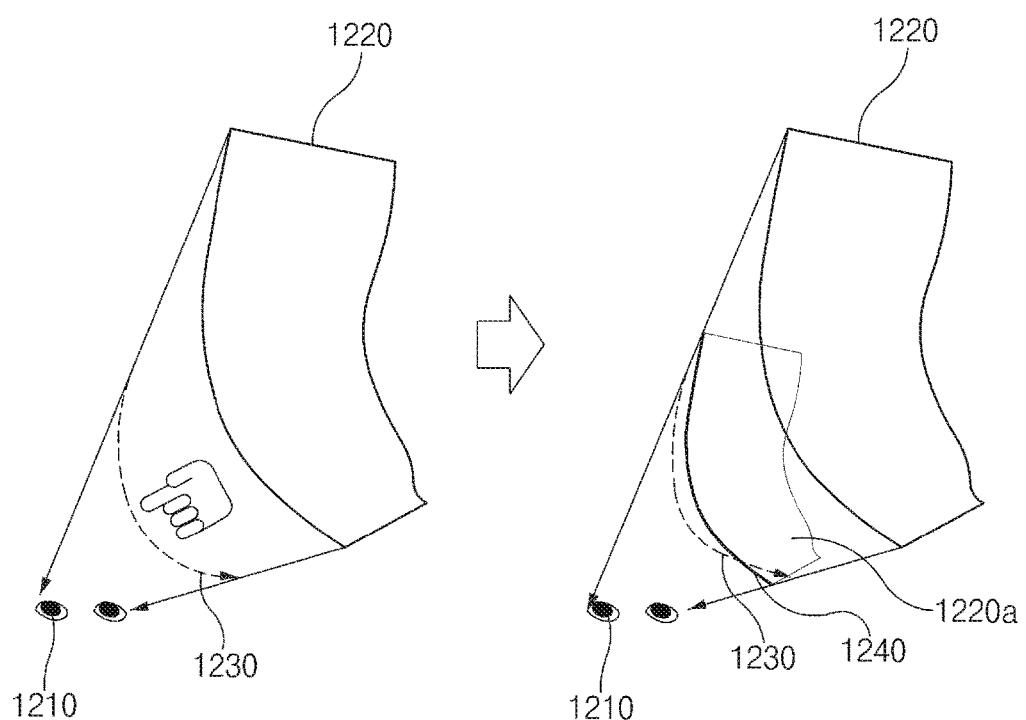
FIG. 12 illustrates an example of compensating a user input of a user according to various embodiments.

FIG. 12 is a drawing illustrating an example of compensating a user input of a user according to various embodiments.

Referring to FIG. 12, upon generating a virtual object, a processor 120 of FIG. 1 can compensate a user input 1230 of a user or the virtual object generated by the user input 1230 using information about an object 1220. The information about the object 1220 can include real object information in which a real object is modeled and virtual object information artificially generated.

The user input 1230 can be an operation where a user moves part of his or her body. Although the user draws the user input 1230 in a desired form (e.g., a line along a straight line, a curve, a circle, an oval, and a boundary of an object), the user input 1230 can be shaken within a certain range. The processor 120 can compensate the user input 1230 using information about the object 1220. For example, if the user wants to draw a line rather than a simple linear shape and a curved shape such as a surface shape of a cup and a shape of a spring, if he or she roughly draws the line, the processor 120 can compensate the user input 1230 based on a line of sight direction of the user, attributes of a user input, object information, and the like to correspond to intention of the user.

In an embodiment, the processor 120 can locate a start point of a virtual object on a boundary portion of a real object 1220 recognized based on information about the line of sight 1210 of the user. For example, the processor 120 can locate the detected real object 1220 as a selected object on an extension line of extending the line of sight 1210 of the user and each of points of the user input 1230 by a straight line and can compensate the user input 1230 using information about the real object 1220.

In another embodiment, the processor 120 can modify a virtual object such that the virtual object follows a boundary line of the real object 1220 close to a user input location using information about the line of sight 1210 of the user.

In another embodiment, as a result of drawing a user input 1230 by the user, if it is determined that a generated virtual object has a similar pattern to part of a boundary of the real object 1220, the processor 120 can modify the virtual object to be identical to the part of the boundary of the real object 1220 of the similar pattern. In various embodiments, when the processor 120 calculates a degree of conformity between the user input 1230 and the real object 1220, a line of sight of the user, his or her posture, or his or her location information can be used.

1) The processor 120 can render a first plane image on a line of sight region based on the line of sight of the user (herein, a plane image can be a 2D image).

2) The processor 120 can render a second plane image on the line of sight region.

3) The processor 120 can display the second plane image on a display.

4) The processor 120 can detect occurrence of a user input.

5) The processor 120 can compare the user input with the first plane image.

6) The processor 120 can change the user input based on the first plane image.

After a drawing gesture of the user occurs, the processor 120 can perform object recognition (or part of the object recognition function) and can modify the drawing gesture input based on the object recognition result.

For example, the user can wear a see-through type of an HMD and can generate a drawing input while seeing a real space. If there is no virtual space information in which a real space is modeled, if the drawing input of the user is completed, the processor 120 can obtain image information corresponding to a real space around the drawn region and can perform image processing (e.g., image recognition, spatial modeling, and the like). The processor 120 can modify the drawing input based on real space information obtained by the image processing result. The processor 120 can operate in the following order.

1) The processor 120 can obtain a plane image based on a line of sight of the user.

2) The processor 120 can detect occurrence of a drawing input through a gesture of the user.

3) The processor 120 can perform image processing of the plane image and can calculate space information.

4) The processor 120 can compare the space information with the drawing input.

5) The processor 120 can modify the drawing input based on comparing the space information with the drawing input.

Alternatively, the processor 120 can operate in the following order.

1) The processor 120 can detect occurrence of a drawing input through a gesture of the user.

2) The processor 120 can obtain a partial plane image corresponding to the periphery of the drawing input.

3) The processor 120 can perform image processing of the partial plane image and can calculate space information.

4) The processor 120 can compare the space information with the drawing input.

5) The processor 120 can modify the drawing input based on comparing the space information with the drawing input.

Figure 13:
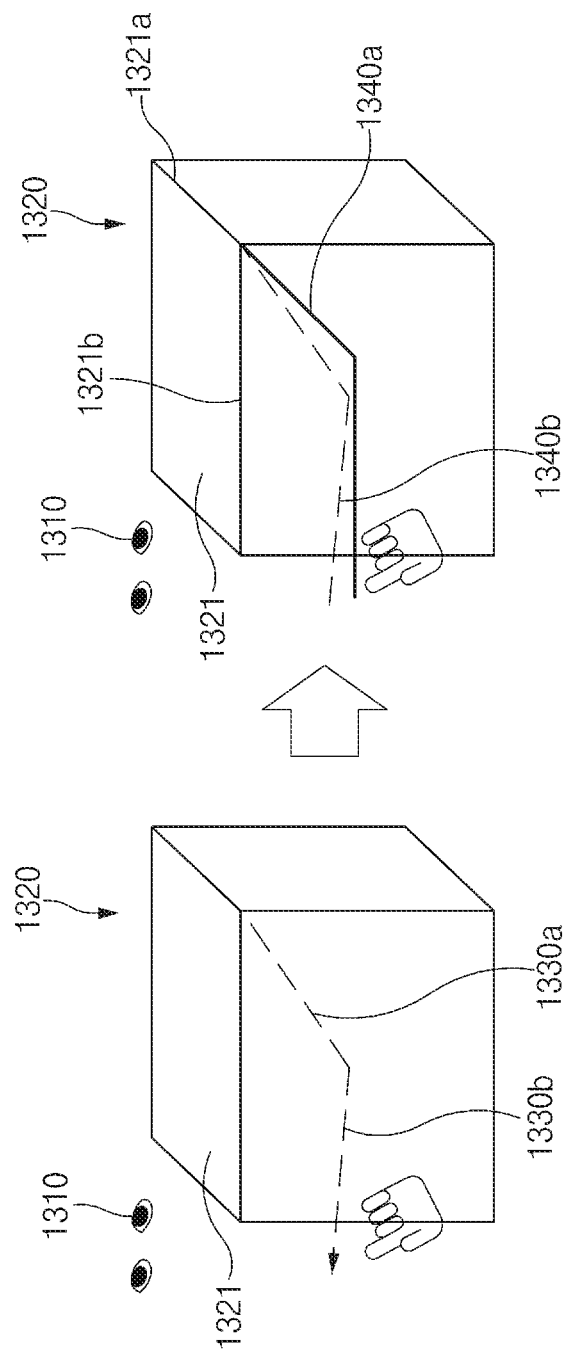
FIG. 13 illustrates an example of displaying a virtual object in which a boundary of a real object is reflected, according to various embodiments.

FIG. 13 is a drawing illustrating an example of displaying a virtual object in which a boundary of a real object is reflected, according to various embodiments.

Referring to FIG. 13, a processor 120 of FIG. 1 can add a drawing virtual object to a plane such as a contour other than a contour of a real object 1320. Also, the processor 120 can modify a drawing on an extension line of the contour of the real object 1320.

If a user draws a line associated with an upper surface 1321 of the real object 1320, the processor 120 can correct an input of the user to be associated with a form of the upper surface 1321.

While the user draws a line along a first boundary 1321a of the upper surface 1321, if a user input 1330a is extended in the same direction as the line, the processor 120 can continue drawing a first virtual line 1340a as a straight line.

If the user continuously draws a user input 1330b perpendicular to the user input 1330a or changed at an angle close to verticality, the processor 120 can draw a second virtual line 1340b to be parallel to the first virtual line 1340a. The second virtual line 1340b can be arranged to be parallel to a second boundary 1321b of the upper surface 1321 on the same plane (e.g., a plane to which the upper surface 1321 is extended).

Figure 14:
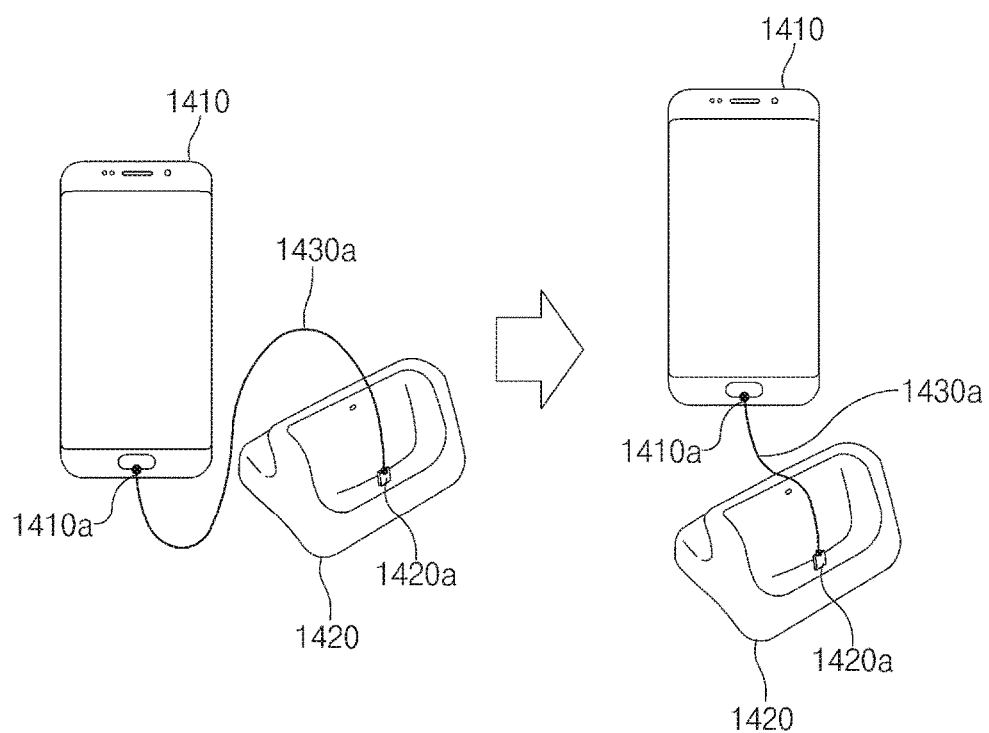
FIG. 14 illustrates an example of a dynamic change of a virtual object according to various embodiments.

FIG. 14 is a drawing illustrating an example of a dynamic change of a virtual object according to various embodiments.

Referring to FIG. 14, if a first real object 1410 and a second real object 1420 are connected to each other via a virtual object 1430a, display attributes of the virtual object 1430a can be changed based on movement of at least one of the first real object 1410 and the second real object 1420.

In an embodiment, if a location of the first real object 1410 or the second real object 1420 is changed, a location of each of a start point and an end point of a drawing virtual object 1430a of a line shape can be changed based on the changed location in response to movement of the first real object 1410 or the second real object 1420. Thus, a size (or length) of the virtual object 1430a or/and a shape (curvature) of the virtual object 1430a can be changed.

Attributes of the drawing virtual object 1430a can be calculated based on attributes (e.g., a direction vector) of each of end points 1410a and 1420. For example, the direction vectors of the end points 1410a and 1420a can be set in a direction perpendicular to a surface faced with a related object (e.g., each of the first real object 1410 and the second real object 1420). A coefficient value of a cubic polynomial curve which represents the drawing virtual object 1430a) can be determined based on the direction vectors.

If display attributes of the virtual object 1430a are changed, the virtual object 1430a can be changed by reflecting line of sight information of a user in the virtual object 1430a.

Example 1) The virtual object 1430a can be changed to avoid a line of sight to an object, based on a line of sight of the user.

Example 2) The virtual object 1430a can be displayed based on a line of sight to an object, based on a line of sight of the user.

Example 3) The virtual object 1430a can be displayed based on a beam effect for an object, based on a line of sight of the user.

According to various embodiments, a virtual object operatively connected with a virtual object (at least one virtual object) in a virtual space can be removed or generated based on changed information of the virtual object. For example, after a curve drawing is input, a start point and an end point of the curve drawing virtual object are connected to a first virtual object and a second virtual object, respectively, when a distance between the first virtual object and the second virtual object is greater than a specified value, the curve drawing virtual object can be automatically removed.

In FIG. 14, an embodiment is exemplified as the drawing virtual object 1430a. However, a change of display attributes of a virtual object can be applied to a label object. For example, in case of a label object generated based on a label (e.g., a book title) displayed on a real object (e.g., a storybook), if the real object (e.g., the storybook) is changed in location, the label can be changed in location, size, or/and shape.

If the display attributes of the virtual object are changed, the virtual object can be changed by reflecting line of sight information of the user in the virtual object.

Example 1) A changed label object can be displayed in the form of a plane irrespective of a line of sight direction of an object, based on a line of sight of the user.

Example 2) A changed label object can change a line of sight direction of a label based on a line of sight direction of an object, based on a line of sight of the user.

Example 3) A changed label object can be displayed based on a beam effect on an object, based on a line of sight of the user.

Example 4) A changed label object can change a size of a label irrespective of a distance from an object, based on a line of sight of the user.

Example 5) A changed label object can fix a size of a label irrespective of a distance from an object, based on a line of sight of the user.

According to various embodiments, a processor 120 of FIG. 1 can determine that a real object (e.g., a storybook) is changed in location based on the generated virtual object information.

In various embodiments, if the first real object 1410 is copied, a copied object (not shown) of the same shape as the first real object 1410 can be formed. For example, if the user selects the first real object 1410 during a specified time or more, a virtual object can connect the copied object with the second real object 1420. If the user moves the copied object, the virtual object can continue connecting the copied object with the second real object 1420.

Figure 15:
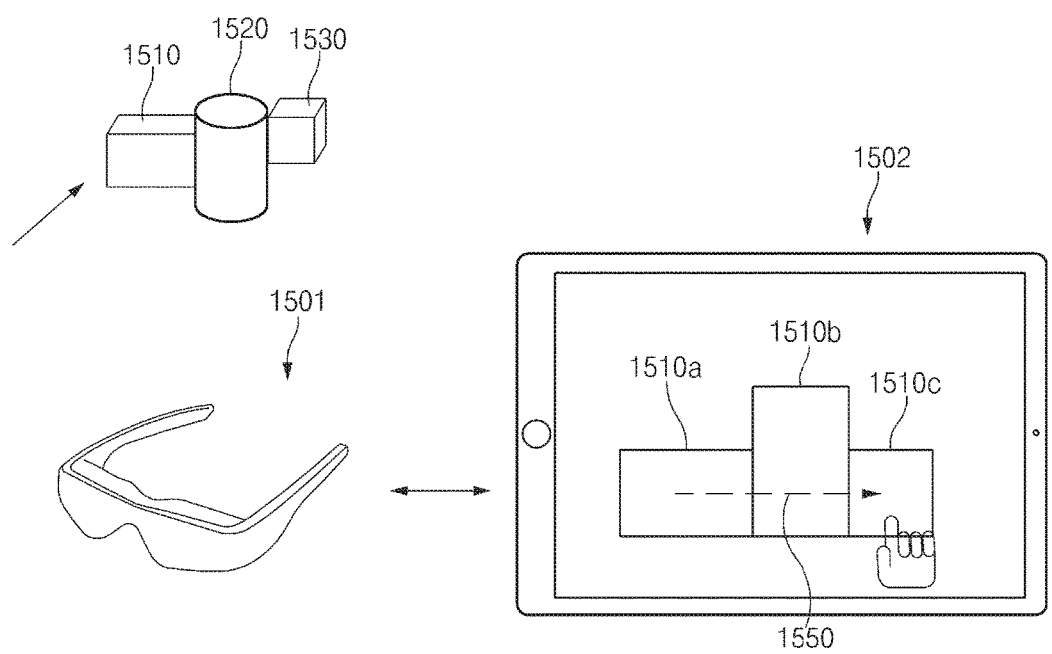
FIG. 15 illustrates an example of changing an input via a separate device for input according to various embodiments.

FIG. 15 is a drawing illustrating an example of changing an input via a separate device for input according to various embodiments.

Referring to FIG. 15, a first electronic device 1501 can be a wearable electronic device such as smart glasses and an HMD, and an electronic device 1502 can be an electronic device such as a tablet personal computer (PC). The first electronic device 1501 can be an electronic device 101 in FIG. 1, and the second electronic device 1502 can be a first or second external electronic device 102 or 104 in FIG. 1.

The first electronic device 1501 can recognize a 3D space including a real object (e.g., first to third objects 1510, 1520, and 1530) around the first electronic device 1501. The first electronic device 1501 can provide 3D recognition information to the second electronic device 1502.

The second electronic device 1502 can two-dimensionally output an image transmitted from the first electronic device 1501. For example, the second electronic device 1502 can output the first to third objects 1510, 1520, and 1530 as graphic symbols 1510a, 1520a, and 1530a, each of which has a shape seen from the A plane, on its display.

According to various embodiments, the second electronic device 1502 can provide an input 1550 of its user to the first electronic device 1501.

The first electronic device 1501 and the second electronic device 1502 can be operated by different users. A first user can be in a state where he or she wears the first electronic device 1501, and a second user can generate the user input 1510 using the second electronic device 1502. For example, the first user and the second user can be in a state where they make a video call with each other using the first electronic device 1501 and the second electronic device 1502.

The first electronic device 1501 can send a captured 3D image to the second electronic device 1502. The second electronic device 1502 can output the received image on its display. If the second user generates the user input 1550 on a 2D display, the first electronic device 1501 can receive information about attributes (e.g., a movement distance, a movement direction, and the like) of the user input 1550. The first electronic device 1501 can generate a virtual object on a 3D space based on the received information. Additional information about adding a virtual object using the first electronic device 1501 and the second electronic device 1502 can be provided with reference to FIGS. 16 to 18.

Figure 16:
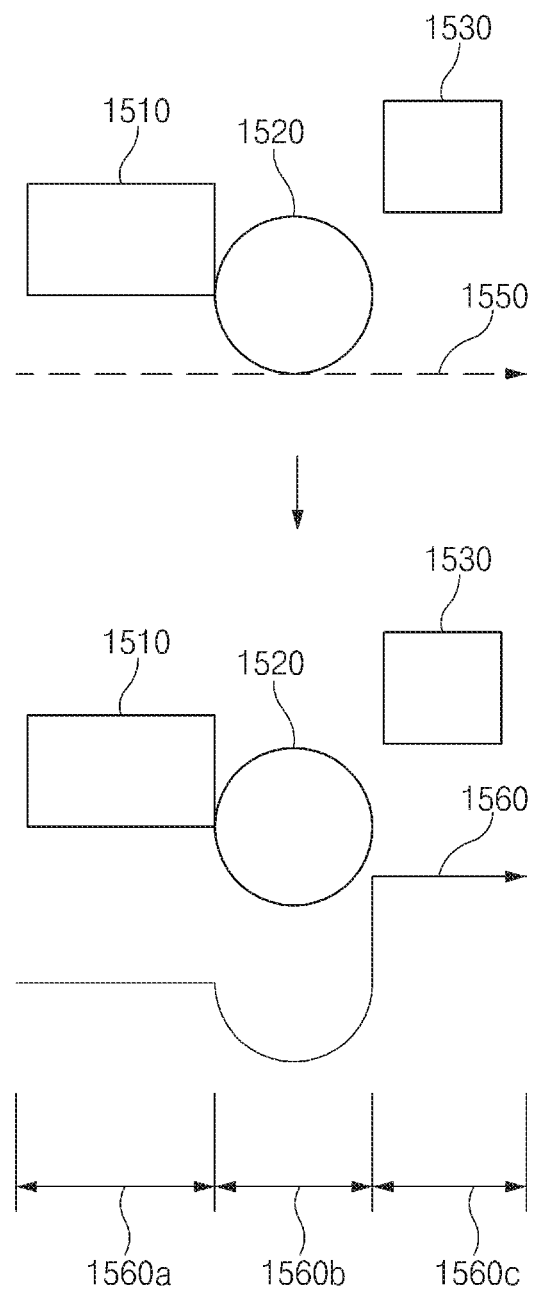
FIG. 16 illustrates a process of generating a virtual object through an external input according to various embodiments.

FIG. 16 is a drawing illustrating a process of generating a virtual object through an external input according to various embodiments. FIG. 16 illustrates a shape in which first to third objects 1510, 1520, and 1530 in FIG. 15 are looked down in a B direction.

Referring to FIG. 16, in a state where the first to third objects 1510, 1520, and 1530 are arranged around a first electronic device 1501 in FIG. 15, a user input 1550 can be sent to the first electronic device 1501 via a second electronic device 1502. A virtual object 1560 can be generated based on the user input 1550.

In various embodiments, the virtual object 1560 can have different forms based on an interval adjacent to each of the first to third objects 1510, 1520, and 1530. The virtual object 1560 can be modified with reference to each of the first to third objects 1510, 1520, and 1530, a contour, and depth information.

For example, a first interval 1560a can be a linear interval based on a surface shape of the first object 1510, and a second interval 1560 can be a curve interval based on a surface shape of the cylindrical second object 1520. The third interval 1560c can be a linear interval based on a surface shape of the third object 1530. Since the third interface 1560c has a longer distance between the object and the user input 1550 than the first interval 1560a, the virtual object 1560 can be moved in a −Z direction in the third interval 1560c.

According to various embodiments, a z coordinate corresponding to (x, y) coordinates of the divided intervals can be converted into a plane coordinate on a space by setting a value of the z coordinate to "0" by the defined information. In another embodiment, the z coordinate can be converted into information of at least one object on an axis corresponding to the (x, y) coordinates. In another embodiment, z coordinates can be collectively converted into one Uz coordinate of a U object selected from at least one object.

In various embodiments, intention of a second user who uses the second electronic device 1502 can be determined as voice information of a time when the user input 1550 is generated and screen information of the second electronic device 1502. For example, if a user of a tablet PC expresses "a straight line along a surface of a first object", the z coordinate corresponding to the input (x, y) coordinates can be converted with reference to depth information of an A object.

Figure 17:
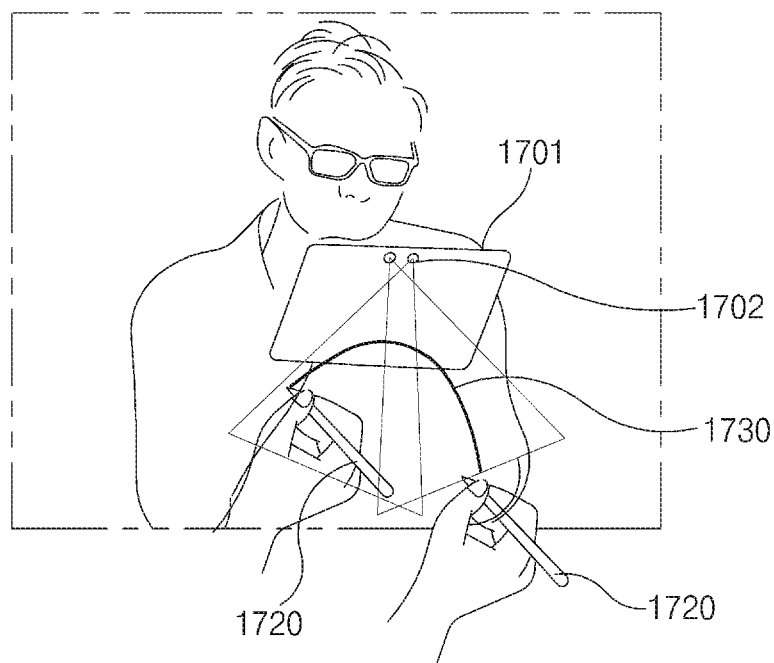
FIG. 17 illustrates an example of configuring a user input using a depth camera according to various embodiments.

FIG. 17 is a drawing illustrating an example of configuring a user input using a depth camera according to various embodiments. An electronic device 1701 can be a second electronic device 1502 in FIG. 15.

Referring to FIG. 17, the electronic device 1701 (e.g., a tablet PC) can include a depth camera 1702. The electronic device 1701 can generate a user input 1730 for generating a virtual object at an external device (e.g., an HMD), using the depth camera 1702.

The electronic device 1701 can store depth data of an image received via the external device (e.g., the HMD). While outputting a screen transmitted from the external device (e.g., the HMD), the electronic device 1701 can overlap an operation of a pen 1720 captured by the depth camera 1702 of the electronic device 1701, which is currently being used, with the output screen.

In this case, only an image transmitted from the external device (e.g., the HMD) and the pen 1720 can be overlapped and output on a screen of the electronic device 1701. A background captured by the depth camera 1702 except for the pen 1720 can be excluded.

For example, if the user pushes a specific button of the pen 1720 and makes a drawing on a 3D space captured by the depth camera 1702 using the pen 1720, the depth camera 1702 can track a specific portion of the pen 1720 and makes an afterimage according to a movement path of the pen 1720 appear or disappear from an image transmitted from the external device (HMD), thus generating and sharing a virtual object.

Figure 18:
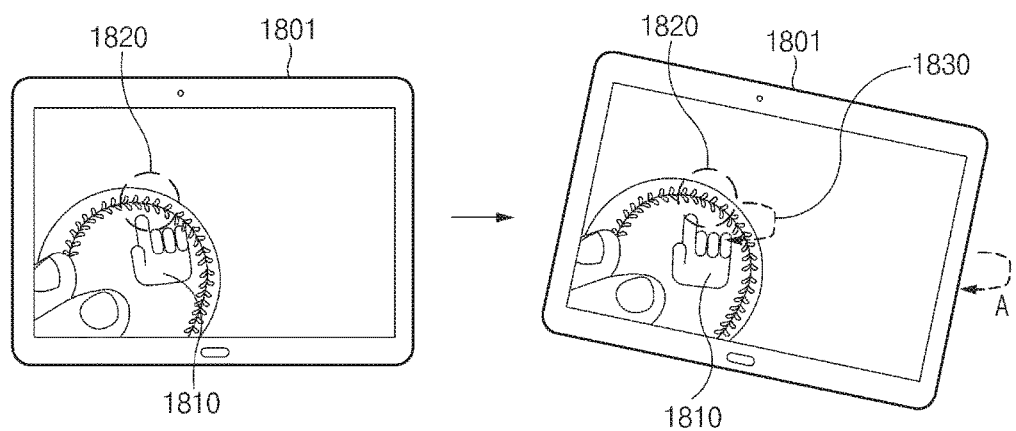
FIG. 18 illustrates an example of generating a user input via a motion sensor according to various embodiments.

FIG. 18 is a drawing illustrating an example of generating a user input via a motion sensor according to various embodiments. An electronic device 1801 can be a second electronic device 1502 in FIG. 15.

Referring to FIG. 18, the electronic device 1801 can generate a user input provided to an external device (e.g., an HMD) via a 3D input (e.g., a force touch, a direction sensor, and a motion sensor). The generated user input can be sent to the external device (e.g., the HMD) and can be used generate a related virtual object.

Example 1) The force touch: the electronic device 1801 can allow its user to generate a user input using two axes and three axes, additionally using pressure information provided to a touch pad by an input of the user. In FIG. 18, attributes of a user input can configured to be changed based on pressure of pushing a touch input 1820.

Example 2) Motion sensing: the electronic device 1801 can sense motion of the electronic device 1801 using a direction sensor or a motion sensor. Attributes of a user input can be changed based on information collected via the motion sensor. For example, if collecting information rotated in an A direction via the motion sensor, the electronic device 1801 can generate a user input 1830 in proportion to a rotation angle.

A wearable electronic device according to various embodiments can include a processor, a display, a memory, a camera module, and a sensor module. The processor can be configured to generate line of sight information of a user of the wearable electronic device based on at least one of the sensor module or the camera module, extract line of sight space information corresponding to the line of sight information of the user from 3D space information corresponding to a real object around the user based on the line of sight information, recognize a user input using the camera module or the sensor module, compare a first portion of the line of sight space information with the user input, generate corrected input information by correcting the user input based on comparing the first portion with the user input, generate a first virtual object based on the corrected input information, and output the first virtual object on the display.

According to various embodiments, the wearable electronic device can be one of smart glasses or a head mount device (HMD). The memory can store information about the real object or the first virtual object included in a 3D virtual space.

Figure 19:
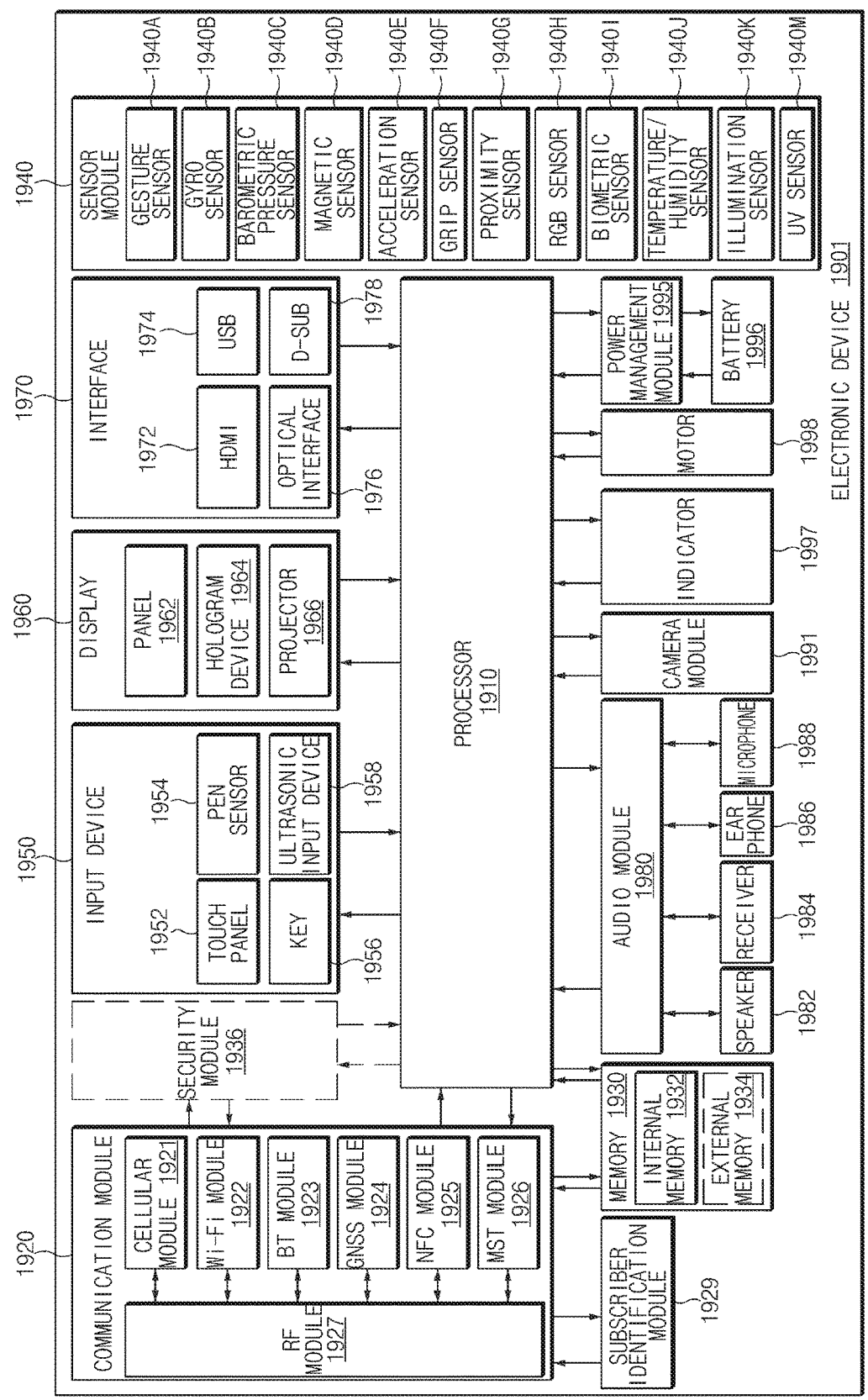
FIG. 19 is a block diagram illustrating a configuration of an electronic device according to various embodiments.

FIG. 19 is a block diagram illustrating a configuration of an electronic device according to various embodiments.

Referring to FIG. 19, an electronic device 1901 can include, for example, all or part of an electronic device 101 shown in FIG. 1. The electronic device 1901 can include one or more processors 1910 (e.g., application processors (APs)), a communication module 1920, a subscriber identification module (SIM) 1929, a memory 1930, a secure module 1936, a sensor module 1940, an input device 1950, a display 1960, an interface 1970, an audio module 1980, a camera module 1991, a power management module 1995, a battery 1996, an indicator 1997, and a motor 1998.

The processor 1910 can execute, for example, an operating system (OS) or an application program to control a plurality of hardware or software components connected thereto and can process and compute a variety of data. The processor 1510 can be implemented with, for example, a system on chip (SoC). According to an embodiment, the processor 1910 can include a graphic processing unit (GPU) (not shown) and/or an image signal processor (not shown). The processor 1910 can include at least some (e.g., a cellular module 1921) of the components shown in FIG. 19. The processor 1910 can load a command or data, received from at least one of other components (e.g., a non-volatile memory), to a volatile memory to process the data and can store various data in a non-volatile memory.

The communication module 1920 can have the same or similar configuration to a communication interface 170 of FIG. 1. The communication module 1920 can include, for example, the cellular module 1921, a wireless-fidelity (Wi-Fi) module 1922, a Bluetooth (BT) module 1923, a global navigation satellite system (GNSS) module 1924 (e.g., a GPS module, a Glonass module, a Beidou module, or a Galileo module), a near field communication (NFC) module 1925, an MST module 1926, and a radio frequency (RF) module 1927.

The cellular module 1921 can provide, for example, a voice call service, a video call service, a text message service, or an Internet service, and the like over a communication network. According to an embodiment, the cellular module 1921 can identify and authenticate the electronic device 1901 in a communication network using the SIM 1929 (e.g., a SIM card). According to an embodiment, the cellular module 1921 can perform at least some of functions which can be provided by the processor 1910. According to an embodiment, the cellular module 1921 can include a communication processor (CP).

The Wi-Fi module 1922, the BT module 1923, the GNSS module 1924, the NFC module 1925, or the MST module 1926 can include, for example, a processor for processing data communicated through the corresponding module. According to various embodiments, at least some (e.g., two or more) of the cellular module 1921, the Wi-Fi module 1922, the BT module 1923, the GNSS module 1924, the NFC module 1925, or the MST module 1926 can be included in one integrated chip (IC) or one IC package.

The RF module 1927 can communicate, for example, a communication signal (e.g., an RF signal). Though not shown, the RF module 1927 can include, for example, a transceiver, a power amplifier module (PAM), a frequency filter, or a low noise amplifier (LNA), or an antenna, and the like. According to another embodiment, at least one of the cellular module 1921, the Wi-Fi module 1922, the BT module 1923, the GNSS module 1924, the NFC module 1925, or the MST module 1926 can communicate an RF signal through a separate RF module.

The SIM 1929 can include, for example, a card which includes a SIM and/or an embedded SIM. The SIM 1929 can include unique identification information (e.g., an integrated circuit card identifier (ICCID)) or subscriber information (e.g., an international mobile subscriber identity (IMSI)).

The memory 1930 (e.g., a memory 130 of FIG. 1) can include, for example, an embedded memory 1932 or an external memory 1934. The embedded memory 1932 can include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1934 can include a flash drive, for example, a compact flash (CF), a secure digital (SD), a micro-SD, a mini-SD, an extreme digital (xD), a multimedia card (MMC), or a memory stick, and the like. The external memory 1934 can operatively and/or physically connect with the electronic device 1901 through various interfaces.

The secure module 1936 can be a module which has a relatively higher secure level than the memory 1930 and can be a circuit which stores secure data and guarantees a protected execution environment. The secure module 1936 can be implemented with a separate circuit and can include a separate processor. The secure module 1936 can include, for example, an embedded secure element (eSE) which is present in a removable smart chip or a removable SD card or is embedded in a fixed chip of the electronic device 1901. Also, the secure module 1936 can be driven by an OS different from the OS of the electronic device 1901. For example, the secure module 1936 can operate based on a java card open platform (JCOP) OS.

The sensor module 1940 can measure, for example, a physical quantity or can detect an operation state of the electronic device 1901, and can convert the measured or detected information to an electric signal. The sensor module 1940 can include at least one of, for example, a gesture sensor 1940A, a gyro sensor 1940B, a barometric pressure sensor 1940C, a magnetic sensor 1940D, an acceleration sensor 1940E, a grip sensor 1940F, a proximity sensor 1940G, a color sensor 1940H (e.g., red, green, blue (RGB) sensor), a biometric sensor 1940I, a temperature/humidity sensor 1940J, an illumination sensor 1940K, or an ultraviolet (UV) sensor 1940M. Additionally or alternatively, the sensor module 1940 can further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1940 can further include a control circuit for controlling at least one or more sensors included therein. In various embodiments, the electronic device 1901 can further include a processor configured to control the sensor module 1940, as part of the processor 1910 or to be independent of the processor 1910. While the processor 1910 is in a sleep state, the electronic device 1901 can control the sensor module 1940.

The input device 1950 can include, for example, a touch panel 1952, a (digital) pen sensor 1954, a key 1956, or an ultrasonic input unit 1958. The touch panel 1952 can use, for example, at least one of a capacitive type, a resistive type, an infrared type, or an ultrasonic type. Also, the touch panel 1952 can include a control circuit. The touch panel 1952 can further include a tactile layer and can provide a tactile reaction to a user.

The (digital) pen sensor 1954 can be, for example, part of the touch panel 1952 or can include a separate sheet for recognition. The key 1956 can include, for example, a physical button, an optical key, or a keypad. The ultrasonic input unit 1958 can allow the electronic device 1901 to detect an ultrasonic wave generated by an input tool, through a microphone (e.g., a microphone 1988) and to verify data corresponding to the detected ultrasonic wave.

The display 1960 (e.g., a display 160 of FIG. 1) can include a panel 1962, a hologram device 1964, or a projector 1966. The panel 1962 can include the same or similar configuration to the display 160. The panel 1962 can be implemented to be, for example, flexible, transparent, or wearable. The panel 1962 and the touch panel 1952 can be integrated into one module. The hologram device 1964 can show a stereoscopic image in a space using interference of light. The projector 1966 can project light onto a screen to display an image. The screen can be positioned, for example, inside or outside the electronic device 1901. According to an embodiment, the display 1960 can further include a control circuit for controlling the panel 1962, the hologram device 1964, or the projector 1966.

The interface 1970 can include, for example, a high-definition multimedia interface (HDMI) 1972, a universal serial bus (USB) 1974, an optical interface 1976, or a D-subminiature 1978. The interface 1970 can be included in, for example, a communication interface 170 shown in FIG. 1. Additionally or alternatively, the interface 1970 can include, for example, a mobile high definition link (MHL) interface, an SD card/multimedia card (MMC) interface, or an infrared data association (IrDA) standard interface.

The audio module 1980 can interchangeably convert a sound into an electric signal. At least some of components of the audio module 1980 can be included in, for example, an I/O interface 150 shown in FIG. 1. The audio module 1980 can process sound information input or output through, for example, a speaker 1982, a receiver 1984, an earphone 1986, or the microphone 1988, and the like.

The camera module 1991 can be a device which captures a still image and a moving image. According to an embodiment, the camera module 1991 can include one or more image sensors (not shown) (e.g., a front sensor or a rear sensor), a lens (not shown), an image signal processor (ISP) (not shown), or a flash (not shown) (e.g., an LED or a xenon lamp).

The power management module 1995 can manage, for example, power of the electronic device 1901. According to an embodiment, though not shown, the power management module 1995 can include a power management integrated circuit (PMIC), a charger IC or a battery or fuel gauge. The PMIC can have a wired charging method and/or a wireless charging method. The wireless charging method can include, for example, a magnetic resonance method, a magnetic induction method, or an electromagnetic method, and the like. An additional circuit for wireless charging, for example, a coil loop, a resonance circuit, or a rectifier, and the like can be further provided. The battery gauge can measure, for example, the remaining capacity of the battery 1996 and voltage, current, or temperature thereof while the battery 1996 is charged. The battery 1996 can include, for example, a rechargeable battery or a solar battery.

The indicator 1997 can display a specific state of the electronic device 1901 or part (e.g., the processor 1910) thereof, for example, a booting state, a message state, or a charging state, and the like. The motor 1998 can convert an electric signal into mechanical vibration and can generate vibration or a haptic effect, and the like. Though not shown, the electronic device 1901 can include a processing unit (e.g., a GPU) for supporting a mobile TV. The processing unit for supporting the mobile TV can process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure can be configured with one or more components, and names of the corresponding elements can be changed according to the type of the electronic device. The electronic device according to various embodiments of the present disclosure can include at least one of the above-mentioned elements, some elements can be omitted from the electronic device, or other additional elements can be further included in the electronic device. Also, some of the elements of the electronic device according to various embodiments of the present disclosure can be combined with each other to form one entity, thereby making it possible to perform the functions of the corresponding elements in the same manner as before the combination.

Figure 20:
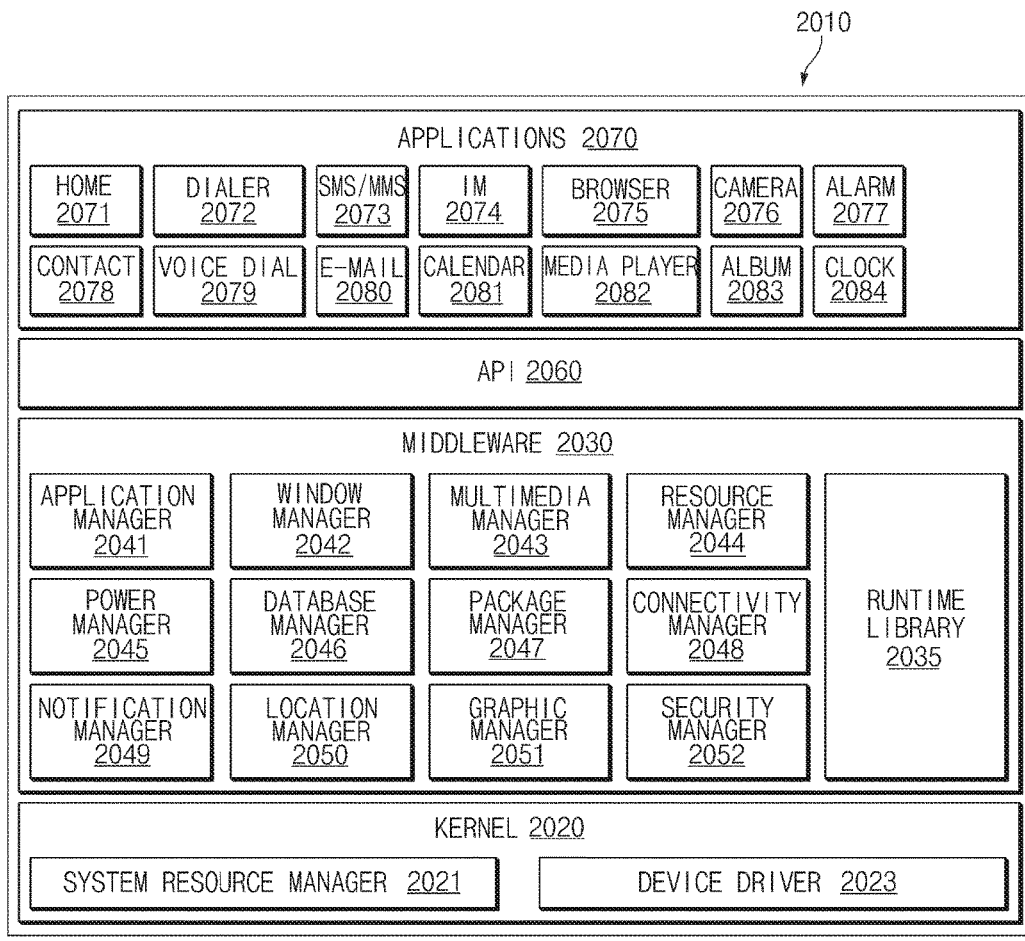
FIG. 20 is a block diagram illustrating a configuration of a program module according to various embodiments.

FIG. 20 is a block diagram 2000 illustrating a configuration of a program module 2010 according to various embodiments.

According to an embodiment, the program module 2010 (e.g., a program 140 of FIG. 1) can include an operating system (OS) for controlling resources associated with an electronic device (e.g., an electronic device 101 of FIG. 1) and/or various applications (e.g., at least one application program 147 of FIG. 1) which are executed on the OS. The OS can be, for example, Android™, iOS™, Windows™, Symbian™, Tizen™, or Bada™.

The program module 2010 can include a kernel 2020, a middleware 2030, an application programming interface (API) 2060, and/or at least one application 2070. At least part of the program module 2010 can be preloaded on the electronic device, or can be downloaded from an external electronic device (e.g., a first external electronic device 102, a second external electronic device 104, or a server 106, and the like of FIG. 1).

The kernel 2020 (e.g., a kernel 141 of FIG. 1) can include, for example, a system resource manager 2021 and/or a device driver 2023. The system resource manager 2021 can control, assign, or collect, and the like system resources. According to an embodiment, the system resource manager 2021 can include a process management unit, a memory management unit, or a file system management unit, and the like. The device driver 2023 can include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 2030 (e.g., a middleware 143 of FIG. 1) can provide, for example, functions the application 2070 needs in common, and can provide various functions to the application 2070 through the API 2060 such that the application 2070 efficiently uses limited system resources in the electronic device. According to an embodiment, the middleware 2030 (e.g., the middleware 143) can include at least one of a runtime library 2035, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, a security manager 2052, or a payment manager (not shown).

The runtime library 2035 can include, for example, a library module used by a compiler to add a new function through a programming language while the application 2070 is executed. The runtime library 2035 can perform a function about input and output management, memory management, or an arithmetic function.

The application manager 2041 can manage, for example, a life cycle of at least one of the at least one application 2070. The window manager 2042 can manage graphic user interface (GUI) resources used on a screen of the electronic device. The multimedia manager 2043 can ascertain a format necessary for reproducing various media files and can encode or decode a media file using a codec corresponding to the corresponding format. The resource manager 2044 can manage source codes of at least one of the at least one application 2070, and can manage resources of a memory or a storage space, and the like.

The power manager 2045 can act together with, for example, a basic input/output system (BIOS) and the like, can manage a battery or a power source, and can provide power information necessary for an operation of the electronic device. The database manager 2046 can generate, search, or change a database to be used in at least one of the at least one application 2070. The package manager 2047 can manage installation or update of an application distributed by a type of a package file.

The connectivity manager 2048 can manage, for example, wireless connection such as Wi-Fi connection or BT connection, and the like. The notification manager 2049 can display or notify events, such as an arrival message, an appointment, and proximity notification, by a method which is not disturbed to the user. The location manager 2050 can manage location information of the electronic device. The graphic manager 2051 can manage a graphic effect to be provided to the user or a user interface (UI) related to the graphic effect. The security manager 2052 can provide all security functions necessary for system security or user authentication, and the like. According to an embodiment, when the electronic device (e.g., the electronic device 101) has a phone function, the middleware 2030 can further include a telephony manager (not shown) for managing a voice or video communication function of the electronic device.

The middleware 2030 can include a middleware module which configures combinations of various functions of the above-described components. The middleware 2030 can provide a module which specializes according to kinds of OSs to provide a differentiated function. Also, the middleware 2030 can dynamically delete some of old components or can add new components.

The API 2060 (e.g., an API 145 of FIG. 1) can be, for example, a set of API programming functions, and can be provided with different components according to OSs. For example, in case of Android or iOS, one API set can be provided according to platforms. In case of Tizen, two or more API sets can be provided according to platforms.

The application 2070 (e.g., the application program 147) can include one or more of, for example, a home application 2071, a dialer application 2072, a short message service/multimedia message service (SMS/MMS) application 2073, an instant message (IM) application 2074, a browser application 2075, a camera application 2076, an alarm application 2077, a contact application 2078, a voice dial application 2079, an e-mail application 2080, a calendar application 2081, a media player application 2082, an album application 2083, a clock application 2084, a payment application (not shown), a health care application (e.g., an application for measuring quantity of exercise or blood sugar, and the like), or an environment information application (e.g., an application for providing atmospheric pressure information, humidity information, or temperature information, and the like), and the like.

According to an embodiment, the application 2070 can include an application (hereinafter, for better understanding and ease of description, referred to as "information exchange application") for exchanging information between the electronic device (e.g., the electronic device 101) and an external electronic device (e.g., the first external electronic device 102 or the second external electronic device 104). The information exchange application can include, for example, a notification relay application for transmitting specific information to the external electronic device or a device management application for managing the external electronic device.

For example, the notification relay application can include a function of transmitting notification information, which is generated by other applications (e.g., the SMS/MMS application, the e-mail application, the health care application, or the environment information application, and the like) of the electronic device, to the external electronic device (e.g., the first external electronic device 102 or the second external electronic device 104). Also, the notification relay application can receive, for example, notification information from the external electronic device, and can provide the received notification information to the user of the electronic device.

The device management application can manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 102 or the second external electronic device 104) which communicates with the electronic device, an application which operates in the external electronic device, or a service (e.g., a call service or a message service) provided from the external electronic device.

According to an embodiment, the application 2070 can include an application (e.g., the health card application of a mobile medical device) which is preset according to attributes of the external electronic device (e.g., the first external electronic device 102 or the second external electronic device 104). According to an embodiment of the present disclosure, the application 2070 can include an application received from the external electronic device (e.g., the server 106, the first external electronic device 102, or the second external electronic device 104). According to an embodiment of the present disclosure, the application 2070 can include a preloaded application or a third party application which can be downloaded from a server. Names of the components of the program module 2010 according to various embodiments of the present disclosure can differ according to kinds of OSs.

According to various embodiments, at least part of the program module 2010 can be implemented with software, firmware, hardware, or at least two or more combinations thereof. At least part of the program module 2010 can be implemented (e.g., executed) by, for example, a processor (e.g., a processor 1910 of FIG. 19). At least part of the program module 2010 can include, for example, a module, a program, a routine, sets of instructions, or a process, and the like for performing one or more functions.

The terminology "module" used herein can mean, for example, a unit including one of hardware, software, and firmware or two or more combinations thereof. The terminology "module" can be interchangeably used with, for example, terminologies "unit", "logic", "logical block", "component", or "circuit", and the like. The "module" can be a minimum unit of an integrated component or a part thereof. The "module" can be a minimum unit performing one or more functions or a part thereof. The "module" can be mechanically or electronically implemented. For example, the "module" can include at least one of an application-specific integrated circuit (ASIC) chip, field-programmable gate arrays (FPGAs), or a programmable-logic device, which is well known or will be developed in the future, for performing certain operations.

According to various embodiments, at least part of a device (e.g., modules or the functions) or a method (e.g., operations) can be implemented with, for example, instructions stored in computer-readable storage media which have a program module. When the instructions are executed by a processor (e.g., a processor 120 of FIG. 1), one or more processors can perform functions corresponding to the instructions. The computer-readable storage media can be, for example, a memory 130 of FIG. 1.

A computer-readable storage media according to various embodiments stores one or more instructions. The instructions can be configured to generate line of sight information of a user of an electronic device based on at least one of a sensor module or a camera module of the electronic device, extract line of sight space information corresponding to the line of sight information of the user from 3D space information corresponding to a real object around the user based on the line of sight information, recognize a user input using the camera module or the sensor module, compare a first portion of the line of sight space information with the user input, generate corrected input information by correcting the user input based on comparing the first portion with the user input, generate a first virtual object based on the corrected input information, and output the first virtual object on a display of the electronic device.

The computer-readable storage media can include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions can include not only mechanical codes compiled by a compiler but also high-level language codes which can be executed by a computer using an interpreter and the like. The above-mentioned hardware device can be configured to operate as one or more software modules to perform operations according to various embodiments of the present disclosure, and vice versa.

Modules or program modules according to various embodiments can include at least one or more of the above-mentioned components, some of the above-mentioned components can be omitted, or other additional components can be further included. Operations executed by modules, program modules, or other components can be executed by a successive method, a parallel method, a repeated method, or a heuristic method. Also, some operations can be executed in a different order or can be omitted, and other operations can be added.

According to various embodiments, the electronic device may generate a virtual object on a real object (or a space around an object) based on line of sight information of the user and real object information.

According to various embodiments, the electronic device may generate a virtual object corresponding to the intention of the user by correcting the user input based on line of sight information of the user and object information around the electronic device and outputting the virtual object based on the corrected user input.

Embodiments of the present disclosure described and shown in the drawings are provided as examples to describe technical content and help understanding but do not limit the scope of the present disclosure. Accordingly, it should be interpreted that besides the embodiments listed herein, all modifications or modified forms derived based on the technical ideas of the present disclosure are included in the scope of the present disclosure as defined in the claims, and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An augmented reality (AR) output method performed in an electronic device, the method comprising:
generating line of sight information of a user of the electronic device based on at least one of a sensor module or a camera module of the electronic device;
extracting three-dimensional (3D) space information corresponding to a real object around the user based on the line of sight information;
recognizing a user input using the camera module or the sensor module;
comparing a first portion of the 3D space information with the user input;
generating compensated input information by compensating the user input based on comparing the first portion with the user input;
generating a first virtual object based on the compensated input information; and
outputting the first virtual object on a display of the electronic device,
wherein generating the first virtual object comprises:
matching each point of the user input to a corresponding point of the 3D space information based on a surface or contour of the real object, and
wherein the corresponding point is placed on an extension line connecting a line of sight with the user input.

2. The method of claim 1, wherein the extracting of the 3D space information comprises:
generating the 3D space information based on the sensor module or the camera module.

3. The method of claim 2, wherein the generating of the 3D space information comprises:
capturing surroundings of the electronic device using the camera module comprising at least one of a color camera, a depth camera, a thermal camera, or an infrared (IR) camera.

4. The method of claim 2, wherein the generating of the 3D space information comprises:
generating the 3D space information comprising a line, a polyline, a curve, a polygon, a circle, an oval, and text information.

5. The method of claim 1, wherein the recognizing of the user input comprises:
recognizing a gesture or an input pattern of the user as the user input.

6. The method of claim 1, wherein the recognizing of the user input comprises:
recognizing the user input by one of a point input or a stroke input.

7. The method of claim 1, wherein the comparing of the first portion and the user input comprises:
extracting a second portion in the 3D space information included in a range corresponding to a path of the user input from the 3D space information; and
measuring a distance between the second portion and a path of the user input.

8. The method of claim 1, wherein the comparing of the first portion and the user input comprises:
calculating plane information comprising a path of the user input;
extracting a second portion in the 3D space information included in a range corresponding to a path of the user input from the 3D space information; and
comparing plane information of the second portion with plane information comprising the path of the user input.

9. The method of claim 1, wherein the comparing of the first portion and the user input comprises:
verifying a corresponding point where the real object is met or adjacent to the extension line for connecting a location of the line of sight of the user with each of points which configure the user input.

10. The method of claim 9, wherein the verifying of the corresponding point comprises:
determining a point, where a surface or contour of the real object is adjacent to the extension line, as the corresponding point.

11. The method of claim 1, wherein the generating of the first virtual object comprises:
generating the first virtual object, if it is determined that the first portion in the 3D space information is similar to the user input based on similarity between the first portion and the user input.

12. The method of claim 1, wherein the generating of the first virtual object comprises:
arranging the virtual object relative to an axis or surface parallel to a central axis or a central surface of the real object.

13. The method of claim 1, wherein the generating of the first virtual object comprises:
generating a virtual object which is extended from a boundary of the real object and forms an angle with the boundary of the real object.

14. The method of claim 1, wherein the recognizing of the user input comprises:
recognizing the user input of connecting a first object with a second object, and
wherein the generating of the first virtual object comprises:

generating the first virtual object connecting a connection point of the first object with a connection point of the second object using a line according to attributes.

15. The method of claim 14, wherein the generating of the first virtual object comprises:
changing attributes of the first virtual object based on a change of the attributes, if it is determined that the attributes of the first object are changed.

16. A wearable electronic device, comprising:
a display;
a memory;
a camera module;
a sensor module; and
a processor configured to:
generate line of sight information of a user of the wearable electronic device based on at least one of the sensor module or the camera module,
extract three-dimensional (3D) space information corresponding to a real object around the user based on the line of sight information,
recognize a user input using the camera module or the sensor module,
compare a first portion of the 3D space information with the user input,
generate compensated input information by compensating the user input based on comparing the first portion with the user input,
generate a first virtual object based on the compensated input information,
match each point of the user input to a corresponding point of a 3D virtual space based on a surface or contour of the real object, and
output the first virtual object on the display,
wherein the corresponding point is placed on an extension line connecting a line of sight with the user input in the 3D virtual space.

17. The electronic device of claim 16, wherein the wearable electronic device is one of smart glasses or a head mount device (HMD).

18. The electronic device of claim 16, wherein the memory is configured to store information about the real object or the first virtual object included in the 3D virtual space.

* * * * *